United States Patent
Fenn et al.

(10) Patent No.: US 10,434,704 B2
(45) Date of Patent: Oct. 8, 2019

(54) ADDITIVE MANUFACTURING USING POLYUREA MATERIALS

(71) Applicant: PPG Industries Ohio, Inc., Cleveland, OH (US)

(72) Inventors: David Robert Fenn, Allison Park, PA (US); Kurt G. Olson, Gibsonia, PA (US); Reza M. Rock, Pittsburgh, PA (US); Cynthia Kutchko, Pittsburgh, PA (US); Susan Donaldson, Allison Park, PA (US); Anthony J. Fogl, Swissvale, PA (US)

(73) Assignee: PPG Industries Ohio, Inc., Cleveland, OH (US)

( * ) Notice: Subject to any disclaimer, the term of this patent is extended or adjusted under 35 U.S.C. 154(b) by 0 days.

(21) Appl. No.: 15/680,846

(22) Filed: Aug. 18, 2017

(65) Prior Publication Data

US 2019/0054681 A1 Feb. 21, 2019

(51) Int. Cl.
| | |
|---|---|
| *C09D 11/102* | (2014.01) |
| *C09D 11/38* | (2014.01) |
| *C08G 18/73* | (2006.01) |
| *B29C 64/112* | (2017.01) |
| *C09D 11/30* | (2014.01) |
| *C08G 18/75* | (2006.01) |
| *C08G 18/10* | (2006.01) |
| *B33Y 70/00* | (2015.01) |
| *C09D 11/03* | (2014.01) |
| *C08G 18/32* | (2006.01) |
| *C08G 18/38* | (2006.01) |
| *C09D 175/02* | (2006.01) |
| *C08G 59/66* | (2006.01) |
| *C09D 175/04* | (2006.01) |
| *C08G 75/045* | (2016.01) |
| *C08G 75/14* | (2006.01) |
| *B33Y 10/00* | (2015.01) |
| *C08G 18/48* | (2006.01) |
| *C08G 18/50* | (2006.01) |
| *C08G 18/79* | (2006.01) |
| *C08K 3/36* | (2006.01) |
| *C08K 3/04* | (2006.01) |

(52) U.S. Cl.
CPC .......... *B29C 64/112* (2017.08); *B33Y 10/00* (2014.12); *B33Y 70/00* (2014.12); *C08G 18/10* (2013.01); *C08G 18/325* (2013.01); *C08G 18/3234* (2013.01); *C08G 18/3821* (2013.01); *C08G 18/755* (2013.01); *C08G 59/66* (2013.01); *C08G 75/045* (2013.01); *C08G 75/14* (2013.01); *C09D 175/02* (2013.01); *C09D 175/04* (2013.01); *C08G 18/3855* (2013.01); *C08G 18/4854* (2013.01); *C08G 18/5024* (2013.01); *C08G 18/792* (2013.01); *C08G 2150/50* (2013.01); *C08K 3/046* (2017.05); *C08K 3/36* (2013.01)

(58) Field of Classification Search
CPC .. C08G 18/10; C08G 18/3234; C08G 18/755; C08G 18/325; C08G 18/3821; C08G 18/792; C08G 18/3855; C08G 18/5024; C08G 18/4854; C09D 175/02
See application file for complete search history.

(56) References Cited

U.S. PATENT DOCUMENTS

| | | |
|---|---|---|
| 3,517,082 A | 6/1970 | Cockerham |
| 3,799,854 A | 3/1974 | Jerabek |
| 3,919,351 A | 11/1975 | Chang |
| 4,046,729 A | 9/1977 | Scriven et al. |
| 4,147,769 A | 4/1979 | Dea et al. |
| 4,220,679 A | 9/1980 | Backhouse |
| 4,403,003 A | 9/1983 | Backhouse |
| 4,546,045 A | 10/1985 | Elias |
| 4,623,711 A | 11/1986 | Morris et al. |
| 4,681,811 A | 7/1987 | Simpson et al. |
| 4,732,790 A | 3/1988 | Blackburn et al. |
| 4,798,746 A | 1/1989 | Claar et al. |
| 5,071,904 A | 12/1991 | Martin et al. |
| 5,468,802 A | 11/1995 | Wilt et al. |
| 5,777,061 A | 7/1998 | Yonek et al. |
| 6,172,179 B1 | 1/2001 | Zook et al. |
| 6,259,962 B1 | 7/2001 | Gothait |
| 6,509,418 B1 | 1/2003 | Zook et al. |
| 6,875,800 B2 | 4/2005 | Vanier et al. |
| 6,894,086 B2 | 5/2005 | Munro et al. |
| 7,009,032 B2 | 3/2006 | Bojkova et al. |
| 7,247,596 B2 | 7/2007 | Jialanella et al. |
| 7,390,859 B2 | 6/2008 | Sawant et al. |
| 7,455,804 B2 | 11/2008 | Patel et al. |
| 7,531,117 B2 | 5/2009 | Ederer et al. |
| 7,578,958 B2 | 8/2009 | Patel et al. |
| 7,767,130 B2 | 8/2010 | Elsner et al. |

(Continued)

FOREIGN PATENT DOCUMENTS

| | | |
|---|---|---|
| CA | 2378348 A1 | 2/2001 |
| CA | 2950215 A1 | 12/2015 |

(Continued)

OTHER PUBLICATIONS

Hunstman Jeffamine Polyetheramines, 2007. (Year: 2007).*
Broekaert, "Polyurea spray coatings: The technology and latest developments", Jan. 2002. (Year: 2002).*
International Preliminary Report on Patentability for Application No. PCT/US2015/062297, dated May 30, 2017, 7 pages.
International Preliminary Report on Patentability for Application No. PCT/US2015/062445, dated May 30, 2017, 8 pages.
International Preliminary Report on Patentability for Application No. PCT/US2015/062412, dated May 30, 2017, 7 pages.

(Continued)

*Primary Examiner* — Christopher M Rodd
(74) *Attorney, Agent, or Firm* — William R. Lambert

(57) ABSTRACT

Methods of additive manufacture using coreactive components are disclosed. Thermosetting compositions for additive manufacturing are also disclosed.

40 Claims, 6 Drawing Sheets

(56) References Cited

U.S. PATENT DOCUMENTS

| | | |
|---|---|---|
| 7,875,666 B2 | 1/2011 | Gilmore et al. |
| 7,879,955 B2 | 2/2011 | Rao et al. |
| 7,955,537 B2 | 6/2011 | Ederer et al. |
| 8,138,273 B2 | 3/2012 | Rao et al. |
| 8,466,220 B2 | 6/2013 | Rao et al. |
| 8,541,513 B2 | 9/2013 | Hobbs et al. |
| 8,729,216 B2 | 5/2014 | Hobbs et al. |
| 8,816,023 B2 | 8/2014 | Anderson et al. |
| 8,883,392 B2 | 11/2014 | Napadensky et al. |
| 8,952,124 B2 | 2/2015 | Rao et al. |
| 8,993,691 B2 | 3/2015 | Anderson et al. |
| 9,079,833 B2 | 7/2015 | Klobes et al. |
| 9,122,819 B2 | 9/2015 | McDowell et al. |
| 9,382,640 B2 | 7/2016 | Yamagata |
| 9,422,451 B2 | 8/2016 | Rao et al. |
| 9,540,540 B2 | 1/2017 | Rao et al. |
| 9,650,537 B2 | 5/2017 | Kunc et al. |
| 9,663,619 B2 | 5/2017 | Echigoya et al. |
| 9,708,440 B2 | 7/2017 | Das et al. |
| 9,744,720 B2 | 8/2017 | Napadensk |
| 9,796,858 B2 | 10/2017 | Powell et al. |
| 9,873,761 B1 | 1/2018 | Das et al. |
| 9,883,711 B2 | 2/2018 | McDowell et al. |
| 9,944,826 B2 | 4/2018 | Czaplewski et al. |
| 9,982,164 B2 | 5/2018 | Rolland et al. |
| 10,016,941 B1 | 7/2018 | Beard et al. |
| 2004/0220327 A1 | 11/2004 | Cosman et al. |
| 2005/0287354 A1 | 12/2005 | Jennings et al. |
| 2006/0046068 A1* | 3/2006 | Barancyk .......... C08G 18/0885 428/423.1 |
| 2006/0108450 A1 | 5/2006 | Klinkenberg et al. |
| 2007/0141267 A1 | 6/2007 | Sonnenschein et al. |
| 2009/0126225 A1 | 5/2009 | Jarvis |
| 2010/0234485 A1 | 9/2010 | Kohli et al. |
| 2012/0117822 A1 | 5/2012 | Jarvis |
| 2013/0244340 A1 | 9/2013 | Davis et al. |
| 2013/0302575 A1 | 11/2013 | Moegele et al. |
| 2014/0012406 A1 | 1/2014 | Cioffi et al. |
| 2014/0017460 A1 | 1/2014 | Xu et al. |
| 2014/0220354 A1 | 8/2014 | Gao et al. |
| 2014/0331520 A1* | 11/2014 | Yakulis, Jr. .......... C08G 18/3234 36/98 |
| 2015/0014881 A1 | 1/2015 | Elsey |
| 2015/0307738 A1 | 10/2015 | Schmucker et al. |
| 2016/0090507 A1 | 3/2016 | Keledjian et al. |
| 2016/0107391 A1 | 4/2016 | Parish et al. |
| 2016/0152775 A1 | 6/2016 | Tobis et al. |
| 2016/0257067 A1 | 9/2016 | Boydston et al. |
| 2016/0271872 A1 | 9/2016 | Sand |
| 2016/0271878 A1 | 9/2016 | Nuechterlein et al. |
| 2016/0333152 A1 | 11/2016 | Cook et al. |
| 2016/0374428 A1 | 12/2016 | Kormann et al. |
| 2017/0057160 A1 | 3/2017 | Duty et al. |
| 2017/0066196 A1 | 3/2017 | Beard et al. |
| 2017/0114208 A1 | 4/2017 | Rao et al. |
| 2017/0246802 A1 | 8/2017 | Pyzik et al. |
| 2017/0266877 A1 | 9/2017 | Tyler |
| 2017/0291357 A1 | 10/2017 | Fong et al. |
| 2017/0321083 A1 | 11/2017 | Fenn et al. |
| 2017/0341296 A1 | 11/2017 | Fenn et al. |
| 2017/0369737 A1 | 12/2017 | Cui et al. |
| 2018/0029291 A1 | 2/2018 | Matzner et al. |
| 2018/0056582 A1 | 3/2018 | Matusik et al. |
| 2018/0059541 A1 | 3/2018 | Campbell et al. |
| 2018/0086002 A1 | 3/2018 | Sun et al. |
| 2018/0100075 A1 | 4/2018 | Chopra et al. |
| 2018/0133952 A1 | 5/2018 | Gu et al. |
| 2018/0133953 A1 | 5/2018 | Achten et al. |
| 2018/0133954 A1 | 5/2018 | Watanabe et al. |
| 2018/0162981 A1 | 6/2018 | Achten et al. |
| 2018/0215854 A1 | 8/2018 | Paranthaman et al. |
| 2018/0264719 A1 | 9/2018 | Rolland et al. |

FOREIGN PATENT DOCUMENTS

| | | | |
|---|---|---|---|
| CN | 104031383 A | 9/2014 | |
| DE | 19937770 A1 | 2/2001 | |
| DE | 102011003619 A1 | 8/2012 | |
| JP | 2003-506228 | 2/2003 | |
| JP | 62-53354 B2 | 12/2017 | |
| RU | 2332265 C2 | 8/2008 | |
| WO | 2006/073695 A1 | 7/2006 | |
| WO | 2007/044735 A2 | 4/2007 | |
| WO | 2013/091003 A1 | 6/2013 | |
| WO | 2016/061060 A1 | 4/2016 | |
| WO | 2016/085914 A1 | 6/2016 | |
| WO | 2016/085976 A1 | 6/2016 | |
| WO | 2016/085992 A1 | 6/2016 | |
| WO | 2016/106352 A1 | 6/2016 | |
| WO | 2016085992 A1 | 6/2016 | |
| WO | WO-2016085914 A1 * | 6/2016 | ......... C08G 18/4854 |
| WO | 2016/201103 A1 | 12/2016 | |
| WO | 2017/087055 A1 | 5/2017 | |
| WO | 2017095658 A1 | 6/2017 | |
| WO | 2018/007579 A1 | 1/2018 | |
| WO | 2018/026829 A1 | 2/2018 | |
| WO | 2018/031532 A1 | 2/2018 | |
| WO | 2018/085650 A1 | 5/2018 | |

OTHER PUBLICATIONS

First Report for Australian Application No. 2015 353730, dated Mar. 15, 2018, 6 pages.
First Report for Australian Application No. 2015 353634, dated Mar. 5, 2018, 6 pages.
First Report for Australian Application No. 2015 353618, dated Sep. 21, 2017, 6 pages.
Canadian Office Action for Application No. 2,968,549, dated May 7, 2018, 4 pages.
Canadian Office Action for Application No. 2,968,670, dated Jun. 11, 2018, 3 pages.
Canadian Office Action for Application No. 2,968,538, dated Jun. 6, 2018, 4 pages.
Russia Office Action for Application No. 2017121858, dated May 16, 2018, 2 pages.
Russia Office Action for Application No. 2017122126, dated May 16, 2018, 4 pages.
International Search Report and Written Opinion for Application No. PCT/US2015/062297, dated Mar. 4, 2016, 10 pages.
International Search Report and Written Opinion for Application No. PCT/US2015/062445, dated Mar. 1, 2016, 10 pages.
International Search Report and Written Opinion for Application No. PCT/US2015/062412, dated Mar. 2, 2016, 9 pages.
Rios et al., "Evaluation of Advanced Polymers for Additive Manufacturing", CRADA Final Report, Sep. 8, 2017.
International Search Report and Written Opinion for Application No. PCT/IB2018/056254, dated Nov. 19, 2018, 10 pages.
Asif, M. et al., "A new photopolymer extrusion 5-axis 3D printer," Additive Manufacturing, 2018, vol. 23, p. 355-361.
Asif, M. et al., "A New 3D Printing Technique Using Extrusion of Photopolymer," Conference Paper, Jan. 2017, 11 pages.
Kitano, H. et al., "Unexpected Visible-Light-Induced Free Radical Photopolymerization at Low Light Intensity and High Viscosity Using a Titanocene Photoinitiator," Journal of Applied Polymer Science, 2013, p. 611-618.
Krober, P. et al., "Reactive inkjet printing of polyurethanes," Journal of Material Chemistry, 2009, vol. 19, p. 5234-5238.
Smith, P. et al., "Reactive inkjet printing," Jornel of Materials Chemistry, 2012, vol. 22, p. 10965-10970.

\* cited by examiner

ADDITIVE MANUFACTURING USING POLYUREA MATERIALS

This invention was made with government support under Contract Number DE-AC05-00OR22725 awarded by the U.S. Department of Energy and under Cooperative Research and Development Agreement NFE-14-05242. The government has certain rights in the invention.

FIELD

The present invention relates to compositions and methods for additive manufacturing of coreactive materials including polyureas.

BACKGROUND

Additive manufacturing is an area of significant interest. Many additive manufacturing methods using a wide variety of materials have been developed, each having their own advantages and disadvantages.

In PCT International Publication No. WO 2016/085914 additive manufacturing using coreactive components is disclosed. The rheological parameters of coreactive compositions were determined and correlated with manufacturability.

SUMMARY

According to the present invention, methods of reactive additive manufacturing comprise providing a first component comprising a first prepolymer into a first pump; providing a second component comprising a second prepolymer into a second pump, wherein the second prepolymer is reactive with the first prepolymer; pumping the first component from the first pump, and the second component from the second pump through a mixer to provide a reactive compositions; and depositing the reactive composition through a nozzle connected to the mixer.

According to the present invention, reactive additive manufacturing compositions comprise: a first component comprising a polyisocyanate prepolymer and a first viscosity; and a second component comprising a polyamine prepolymer and a second viscosity, wherein the first viscosity is within ±20% of the second viscosity, wherein viscosity is measured using an Anton Paar MCR 301 or 302 rheometer with a 25 mm-diameter parallel plate spindle, an oscillation frequency of 1 Hz and amplitude of 0.3%, and with a rheometer plate temperature of 25° C.

According to the present invention, objects are formed using compositions according to the present invention.

According to the present invention, methods of additive manufacturing, comprise extruding the composition according to the present invention using a two component progressive cavity pump.

BRIEF DESCRIPTION OF THE DRAWINGS

The drawings described herein are for illustration purposes only. The drawings are not intended to limit the scope of the present disclosure.

DETAILED DESCRIPTION

Figure 1:
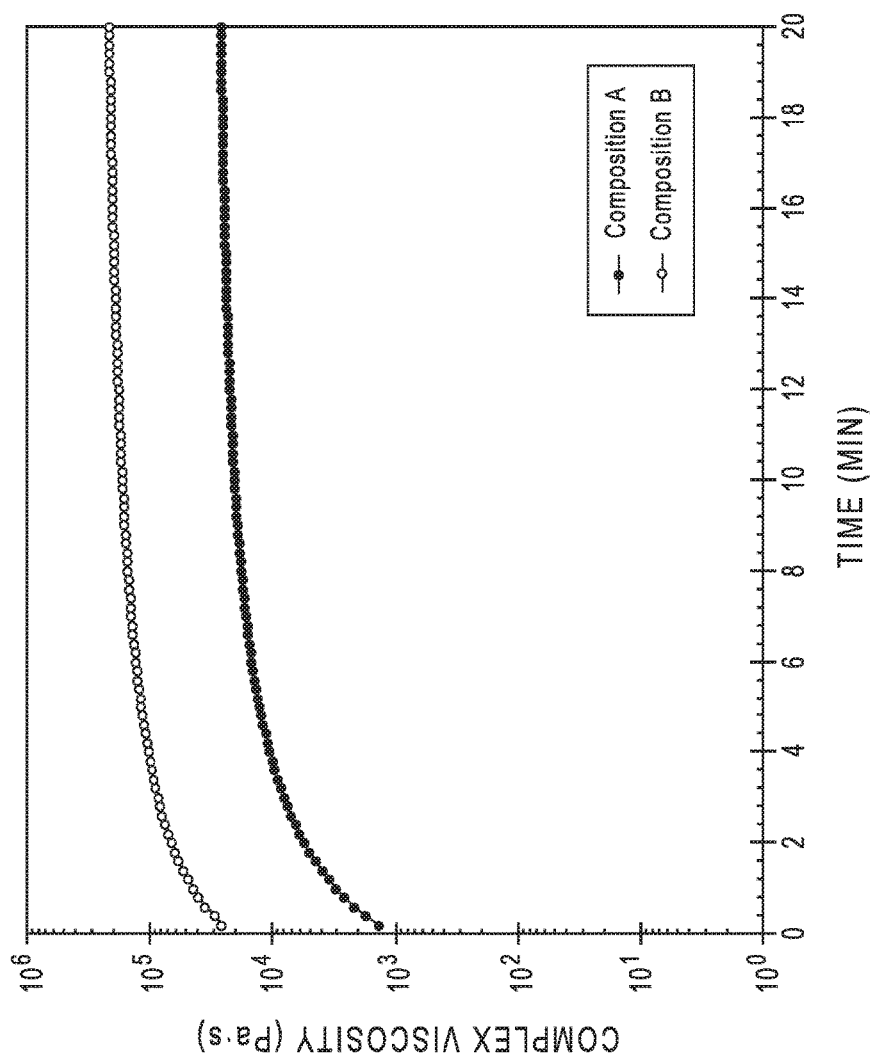
FIG. 1 is a graph showing the complex viscosity during cure for two polyurea compositions.

For purposes of the following detailed description, it is to be understood that the invention may assume various alternative variations and step sequences, except where expressly specified to the contrary. Moreover, other than in any operating examples or where otherwise indicated, all numbers expressing, for example, quantities of ingredients used in the specification and claims are to be understood as being modified in all instances by the term "about." Accordingly, unless indicated to the contrary, the numerical parameters set forth in the following specification and attached claims are approximations that may vary depending upon the desired properties to be obtained by the present invention. At the very least, and not as an attempt to limit the application of the doctrine of equivalents to the scope of the claims, each numerical parameter should at least be construed in light of the number of reported significant digits and by applying ordinary rounding techniques. Notwithstanding that the numerical ranges and parameters setting forth the broad scope of the invention are approximations, the numerical values set forth in the specific examples are reported as precisely as possible. Any numerical value, however, inherently contains certain errors necessarily resulting from the standard variation found in their respective testing measurements.

Also, it should be understood that any numerical range recited herein is intended to include all sub-ranges subsumed therein. For example, a range of "1 to 10" is intended to include all sub-ranges between (and including) the recited minimum value of 1 and the recited maximum value of 10, that is, having a minimum value equal to or greater than 1 and a maximum value of equal to or less than 10.

The use of the singular includes the plural and plural encompasses singular, unless specifically stated otherwise. In addition, the use of "or" means "and/or" unless specifically stated otherwise, even though "and/or" may be explicitly used in certain instances.

Additive manufacturing using coreactive components has several advantages compared to alternative additive manufacturing methods. Additive manufacturing using coreactive components can create stronger parts because the materials forming successive layers can be coreacted to from covalent bonds between the layers. Also, because the components have a low viscosity when mixed higher filler content can be used. The higher filler content can be used to modify the mechanical and/or electrical properties of the materials and the built object. Coreactive components can extend the chemistries used in additively manufactured parts to provide improved properties such as solvent resistance and thermal resistance.

For additive manufacturing of coreactive components it is generally desirable that the rate of reaction between the reactive components and/or the deposition process be controlled such that the composition maintains a relatively low viscosity during deposition and increases viscosity to provide a stable base upon which to apply subsequent layers.

There are a number of chemistries that can be employed in additive manufacturing of coreactive components. Examples of coreactive systems include polyisocyanates and polyamines which form polyureas. Polyureas are attractive for use in reactive additive manufacturing. The reaction of polyisocyanates and polyamines can proceed rapidly at room temperature thereby avoiding the need to control heat flow during deposition. The polyurea reaction can also proceed rapidly in the absence of a catalyst.

The present disclosure is directed to the production of structural objects using three-dimensional printing. A three-dimensional object may be produced by forming successive portions or layers of an object by depositing at least two coreactive components onto a substrate and thereafter depositing additional portions or layers of the object over the underlying deposited portion or layer. Layers are successively deposited to build a printed object. The coreactive components can be mixed and then deposited or can be deposited separately. When deposited separately, the components can be deposited simultaneously, sequentially, or both simultaneously and sequentially.

Deposition and similar terms refer to the application of a printing material comprising a thermosetting or coreactive composition and/or its reactive components onto a substrate (for a first portion of the object) or onto previously deposited portions or layers of the object. Each coreactive component may include monomers, prepolymers, adducts, polymers, and/or crosslinking agents, which can chemically react with the constituents of the other coreactive component.

By "portions of an object" is meant subunits of an object, such as layers of an object. The layers may be on successive horizontal parallel planes. The portions may be parallel planes of the deposited material or beads of the deposited material produced as discreet droplets or as a continuous stream of material. The at least two coreactive components may each be provided neat or may also include a solvent (organic and/or water) and/or other additives as described below. Coreactive components provided by the present disclosure may be substantially free of solvent. By substantially free is meant less than about 5 wt %, less than about 4 wt %, less than about 2 wt %, or less than 1 wt % of solvent, where wt % is based on the total weight of a composition.

The at least two coreactive components may be mixed together and subsequently deposited as a mixture of coreactive components that react to form portions of an object. For example, two coreactive components may be mixed together and deposited as a mixture of coreactive components that react to form a thermoset by delivery of at least two separate streams of the coreactive components into a mixer such as a static mixer and/or a dynamic mixer to produce a single stream that is then deposited. The coreactive components may be at least partially reacted by the time a composition comprising the reaction mixture is deposited. The deposited reaction mixture may react at least in part after deposition and may also react with previously deposited portions and/or subsequently deposited portions of the object such as underlying layers or overlying layers of the object.

The two or more coreactive components can be deposited by dispensing materials through a disposable nozzle attached to a progressive cavity two-component dosing system such as a ViscoTec ecoDUO 450 precision dosing system, where the coreactive components are mixed in-line. A two-component dosing system can comprise, for example, two progressive cavity pumps that separately dose reactants into a disposable static mixer dispenser or into a dynamic mixer. Other suitable pumps include syringe pumps and peristaltic pumps. Upon dispensing, the coreactive materials form an extrudate to provide an initial layer of coreactive material and successive layers on a base. The dosing system can be positioned orthogonal to the base, but also may be set at any suitable angle to form the extrudate such that the extrudate and dosing system form an obtuse angle with the extrudate being parallel to the base. The extrudate refers to the combined coreactive components that have been mixed, for example, in a static mixer or in a dynamic mixer.

The base, the dosing system, or both the base and the dosing system may be moved to build up a three-dimensional object. The motion can be made in a predetermined manner, which may be accomplished using any suitable CAD/CAM method and apparatus such as robotics and/or computerize machine tool interfaces.

An extrudate may be dispensed continuously or intermittently to form an initial layer and successive layers. For intermittent dispensing, a dosing system may interface with a relay switch to shut off the pumps, such as the progressive cavity pumps and stop the flow of coreactive materials. Any suitable switch such as an electromechanical switch that can be conveniently controlled by any suitable CAD/CAM methodology can be used.

A dispensing system can include an in-line static and/or dynamic mixer as well as separate pressurized pumping compartments to hold the at least two coreactive components and feed the coreactive materials into the static and/or dynamic mixer. A mixer such as an active mixer can comprise a variable speed central impeller having high shear blades within a conical nozzle. A range of conical nozzles may be used which have an exit orifice diameter from 0.2 mm to 4.0 mm.

A range of static and/or dynamic mixing nozzles may be used which have, for example, an exit orifice diameter from 0.6 mm to 2.5 mm, and a length from 30 mm to 150 mm. For example, an exit orifice diameter can be from 0.2 mm to 4.0 mm, from 0.4 mm to 3.0 mm, from 0.6 mm to 2.5 mm, from 0.8 mm to 2 mm, or from 1.0 mm to 1.6 mm. A static mixer and/or dynamic can have a length, for example, from 10 mm to 200 mm, from 20 mm to 175 mm, from 30 mm to 150 mm, or from 50 mm to 100 mm. A mixing nozzle can include a static and/or dynamic mixing section and a dispensing section coupled to the static and/or dynamic mixing section. The static and/or dynamic mixing section can be configured to combine and mix the coreactive materials. The dispensing section can be, for example, a straight tube having any of the above orifice diameters. The length of the dispensing section can be configured to provide a region in which the coreactive components can begin to react and build viscosity before being deposited on the object. The length of the dispensing section can be selected, for example, based on the speed of deposition, the rate of reaction of the coreactants, and the desired viscosity. Coreactants can have a residence time in the static and/or dynamic mixing nozzle, for example, from 0.25 seconds to 5 seconds, from 0.3 seconds to 4 seconds, from 0.5 seconds to 3 seconds, or from 1 seconds to 3 seconds. Other residence times can be used as appropriate based on the curing chemistries and curing rates. The flow rate can be, for example, from 1 mL/min to 20 mL/min, from 2 mL/min to 15 mL/min, from 3 mL/min to 10 mL/min, or from 4 mL/min to 8 mL/min, through a nozzle having a diameter, for example, from 0.8 mm to 1 mm.

A static and/or dynamic mixing nozzle can be heated or cooled to control the rate of reaction between the coreactive materials and/or the viscosity of the coreactive materials.

For example, coreactive compositions useful in additive manufacturing can exhibit a tack free time measured using a cotton ball test as described in the examples of longer than 3 minutes, longer than 4 minutes, longer than 5 minutes, or longer than 6 minutes after mixing the coreactive compositions. Coreactive compositions having a tack free time less than 3 minutes tend to cure too fast for practical application. For example, such coreactive compositions can become too viscous in the static and/or dynamic mixing nozzle and can clog the nozzle.

Coreactive compositions useful in additive manufacturing can have a G"/G' ratio (ratio of shear loss modulus G" to shear storage modulus G'), for example, greater than 2, greater than 3 or greater than 4, determined at t=0 after mixing the coreactive compositions.

Suitable coreactive chemistries include polyurea chemistries. As an example of a polyurea chemistry, a polyisocyanate can comprise a polyisocyanate prepolymer and/or polyisocyanate monomer, and a polyamine component can comprise a polyamine prepolymer and/or polyamine monomer.

A polyisocyanate and/or a polyamine can be difunctional, trifunctional, or a combination thereof. A polyisocyanate and/or polyamine can comprise prepolymers and/or monomers having a functionality, for example from four (4) to six (6).

A polyisocyanate prepolymer and/or polyamine prepolymer can have a molecular weight, for example, from 500 Daltons to 8,000 Daltons, from 1,000 Daltons to 6,000 Daltons, from 1,500 Daltons to 5,500 Daltons, or from 2,000 Daltons to 6,000 Daltons.

A polyisocyanate can comprise the reaction product of reactants comprising a polyol prepolymer and a polyisocyanate such as a diisocyanate and/or the reaction product of reactants comprising a polyamine prepolymer and a polyisocyanate such as a diisocyanate.

A polyisocyanate can be prepared by reacting a polytetramethylene ether glycol such as Polymeg® (LyondellBasell) having a molecular weight within a range from 500 Daltons to 2,500 Daltons with a diisocyanate such as isophorone diisocyanate.

A polyisocyanate can be prepared by reacting a polyetheramine such as Jeffamine® (Huntsman), e.g., a polyoxypropylenediamine, having a molecular weight within a range from 500 Daltons to 2,500 Daltons with a diisocyanate such as isophorone diisocyanate.

Reactive compositions provided by the present disclosure can comprise a filler. For example a reactive composition can comprise from 0.1 wt % to 30 wt %, from 0.1 wt % to 20 wt %, from 2 wt % to 20 wt %, or from 5 wt % to 15 wt %, wherein wt % is based on the total weight of the reactive composition. The polyisocyanate component, the polyamine component, or both the polyisocyanate and polyamine components can comprise filler.

To facilitate complete mixing of the coreactants in the static and/or dynamic mixing nozzle, it can be useful that the viscosity of the coreactive compositions be similar such as, for example, within 5%, within 10%, or within 20% of each other. The filler can be added to impart certain properties to a built object and/or as rheology modifier.

When using a coreactive system in which one component comprises a higher molecular weight prepolymer and the second component comprises a lower molecular weight curing agent, it can be desirable to increase the viscosity of the second component comprising the lower molecular weight curing agent. Increasing the amount (wt %) filler in the reactive composition can increase the initial viscosity of a component and can slow the increase in viscosity of the curing composition.

Figure 2:
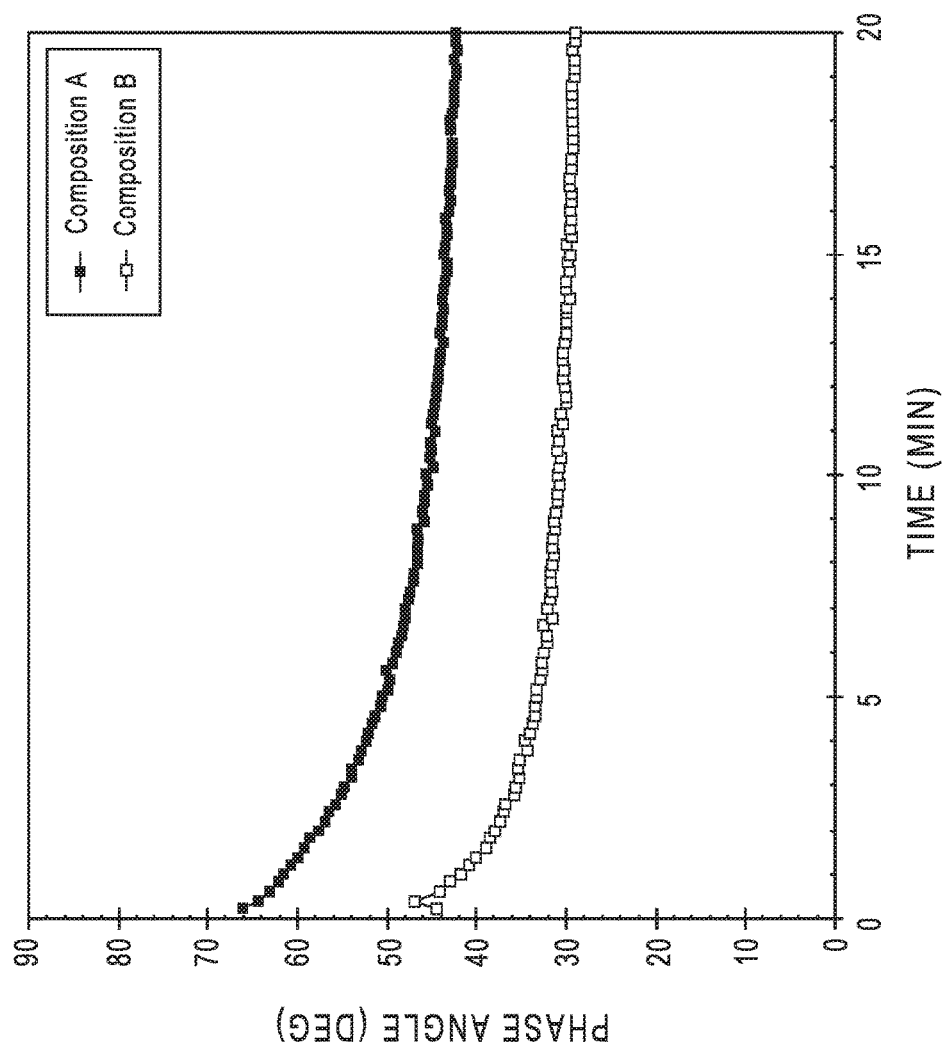
FIG. 2 is a graph showing the phase angle viscosity during cure for two polyurea compositions.

The complex viscosity $|\eta^*|$ and the phase angle $\delta$ for two compositions after mixing with the polyamine curing agent are shown in FIGS. 1 and 2, respectively. Note that the compositions referred to in the figures as Composition A and Composition B do not correspond to the compositions evaluated in Example 1.

Composition B (with Jeffamine® D-2000/IPDI) is more elastic than composition A (with Polymeg® 2000/IPDI). A complex viscosity $|\eta^*|$ within a range from about $10^4$ to $10^5$ Pa·s is suitable for additive manufacturing and provides successful builds. However, as reflected in the low initial phase angle of about 45° (FIG. 2), composition B rapidly cures rendering the material unsuitable for additive manufacturing. Composition A, on the other hand begins with an initial phase angle $\delta$ of about 65° and does not fall to 45° until about 8 minutes after the polyisocyanate and polyamine components are first mixed. In general, a composition is no longer printable when the phase angle is 45° and less.

Figure 3:
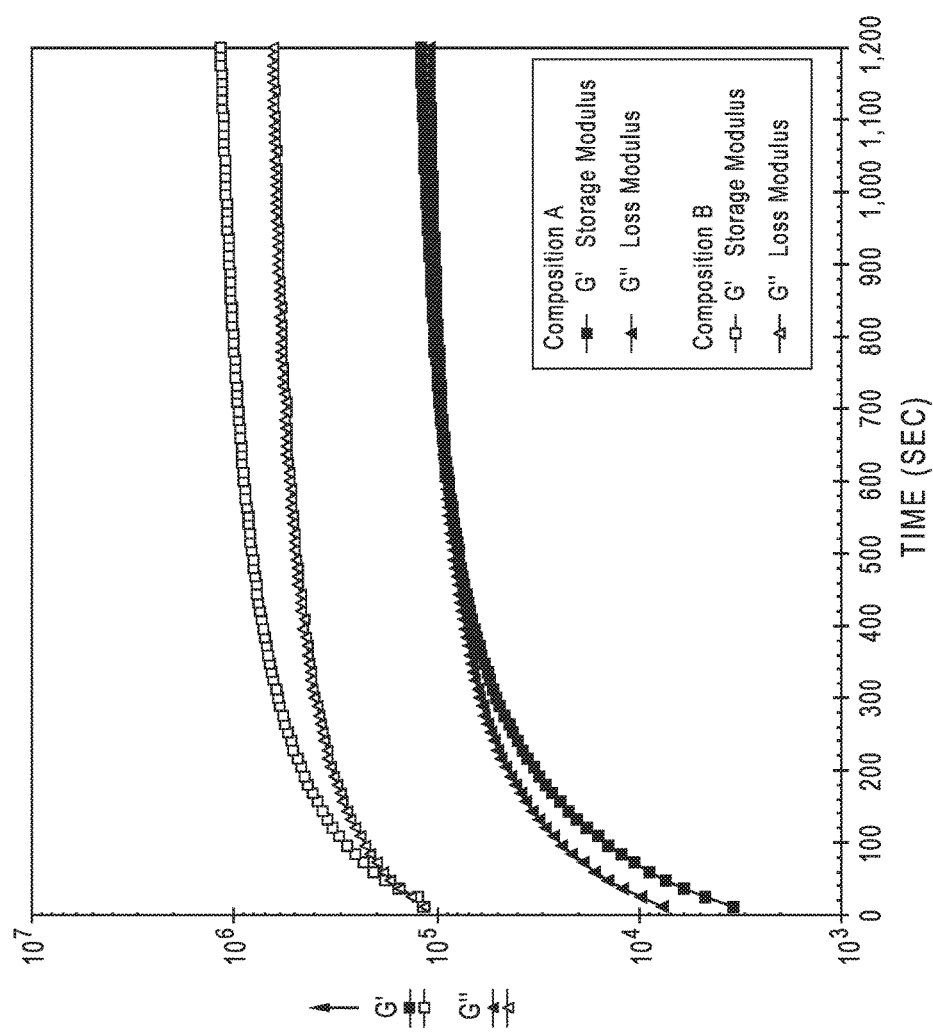
FIG. 3 shows the shear storage modulus G' and the shear loss modulus G" during cure for two polyurea compositions.

FIG. 3 shows the shear storage modulus G' and the shear loss modulus G" with time for two compositions. Composition A comprising Polymeg® 2000/IPDI, Jeffamine® T-5000, and 5 wt % filler exhibited an initial modulus ratio G"/G' of about 2 and after about 7 minutes reached a ratio of about 1.

In comparison, reactive composition B comprising Jeffamine® D-2000/IPDI Jeffamine® T-5000, and 5 wt % filler exhibited an initial modulus ratio G"/G' of about 1 and increased over time to a ratio less than 1.

Phase angle $\delta$ depicted in FIG. 2 is calculated from the values reported in FIG. 3 using the relation tan $\delta$=G"/G'.

Figure 4:
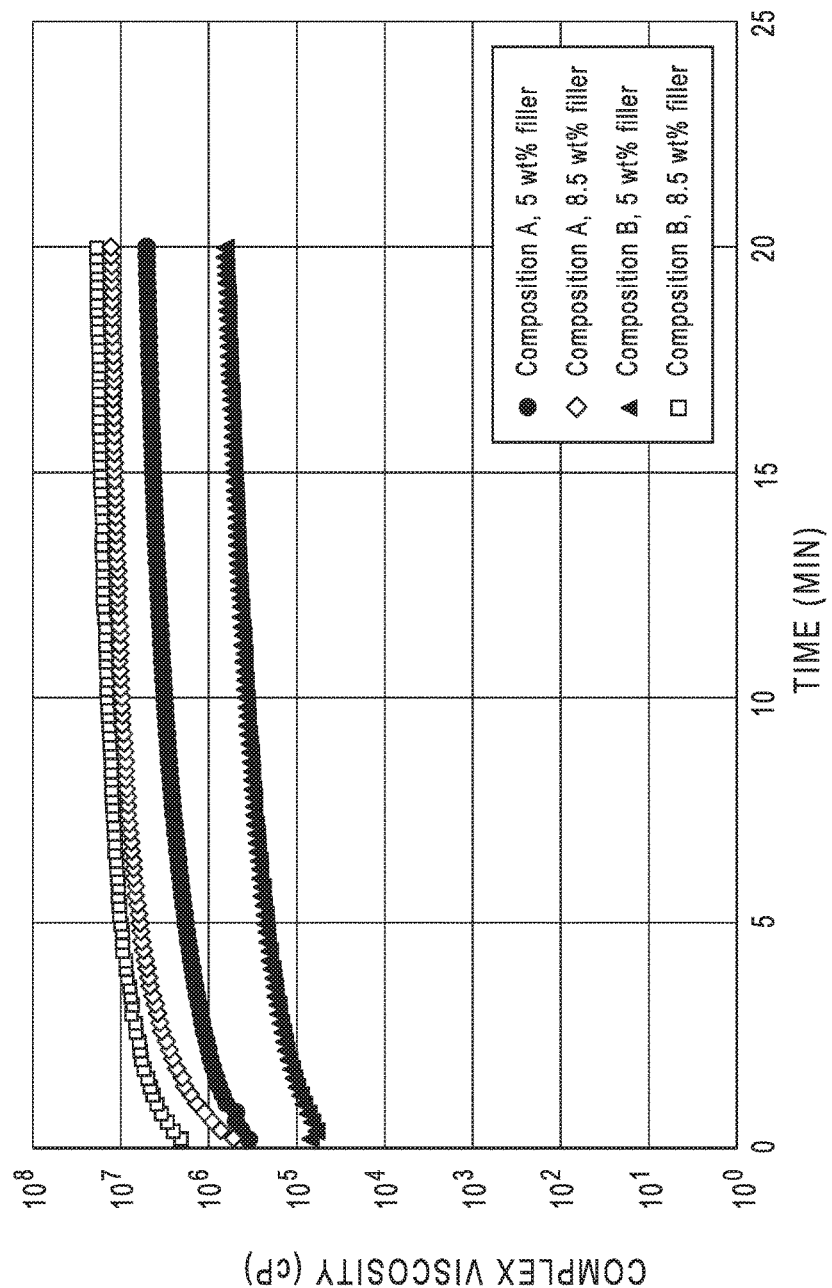
FIG. 4 is a graph showing the complex viscosity during cure for four polyurea compositions.
Figure 5:
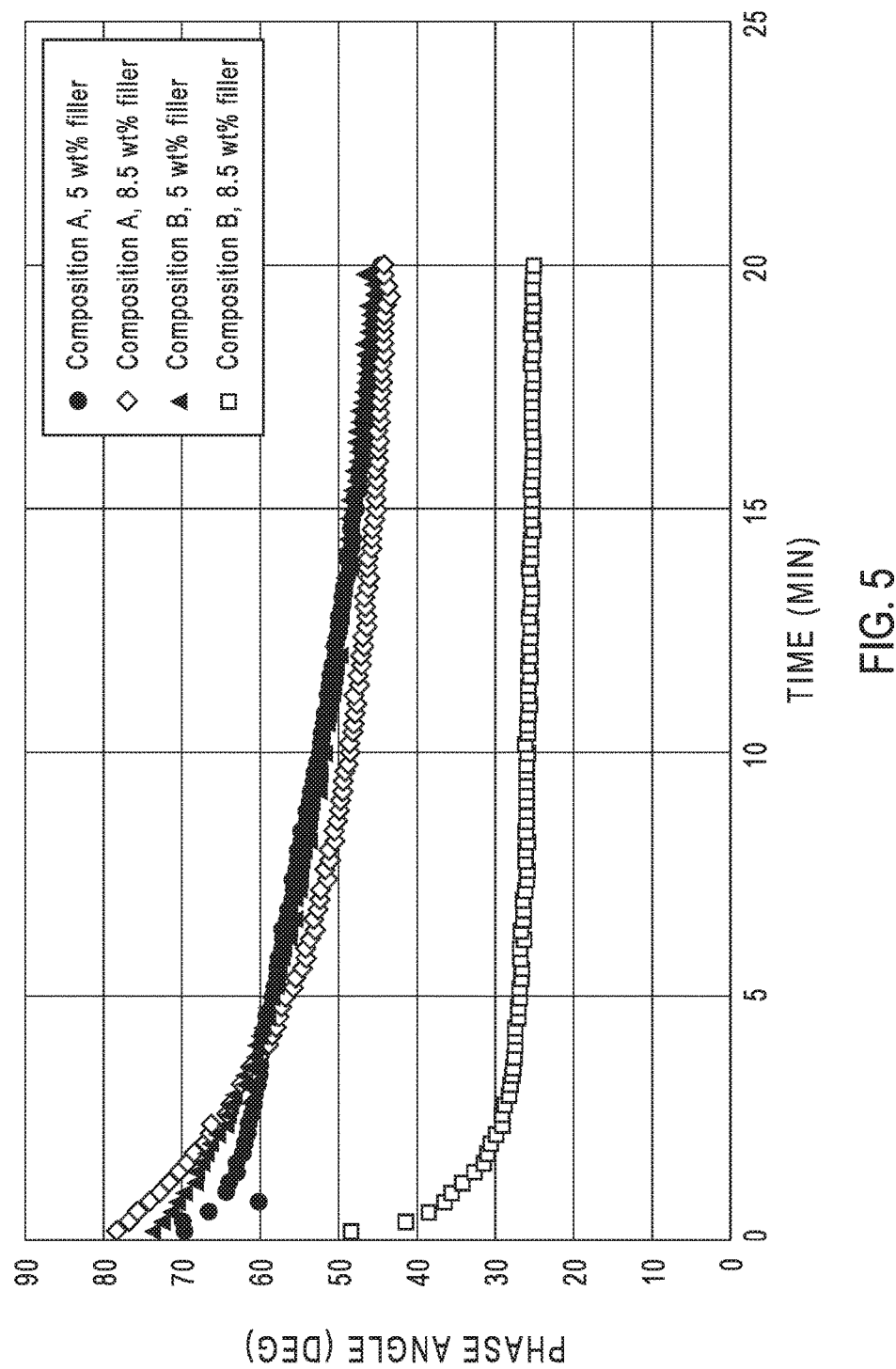
FIG. 5 is a graph showing the complex viscosity during cure for four polyurea compositions.

FIGS. 4 and 5 shown the complex viscosity and phase angle, respectively for various compositions having different amounts of filler. Composition A included Polymeg® 2000/IPDI combined with Jeffamine® T5000, Clearlink® 1000, Petrolite® T5000, and filler. Composition B included Jeffamine® D2000/IPDI combined with Jeffamine® T5000, Clearlink® 1000, Petrolite® T5000, and filler. The amount of the Cabosil® TS-720 fumed silica is indicated in the figures.

Also, the initial storage modulus G' and shear loss modulus G" was about one (1) order of magnitude less for the Polymeg® 2000 composition compared to the Jeffamine® D-2000 composition.

Based on the experimental results, it has been determined that compositions having the following properties after mixing the coreactive components, either independently or in various combinations can be successfully printed using, for example, a two component progressive cavity pump: initial G"/G' ratio is within a range from 1 to 5, such as greater than 2, greater than 3 or greater than 4; initial phase angle $\delta$ within a range from 45° to 89°; tan $\delta$>45 at 7 minutes; and/or initial viscosities of the single coreactive components differ from each other by no more than 20%.

Figure 6:
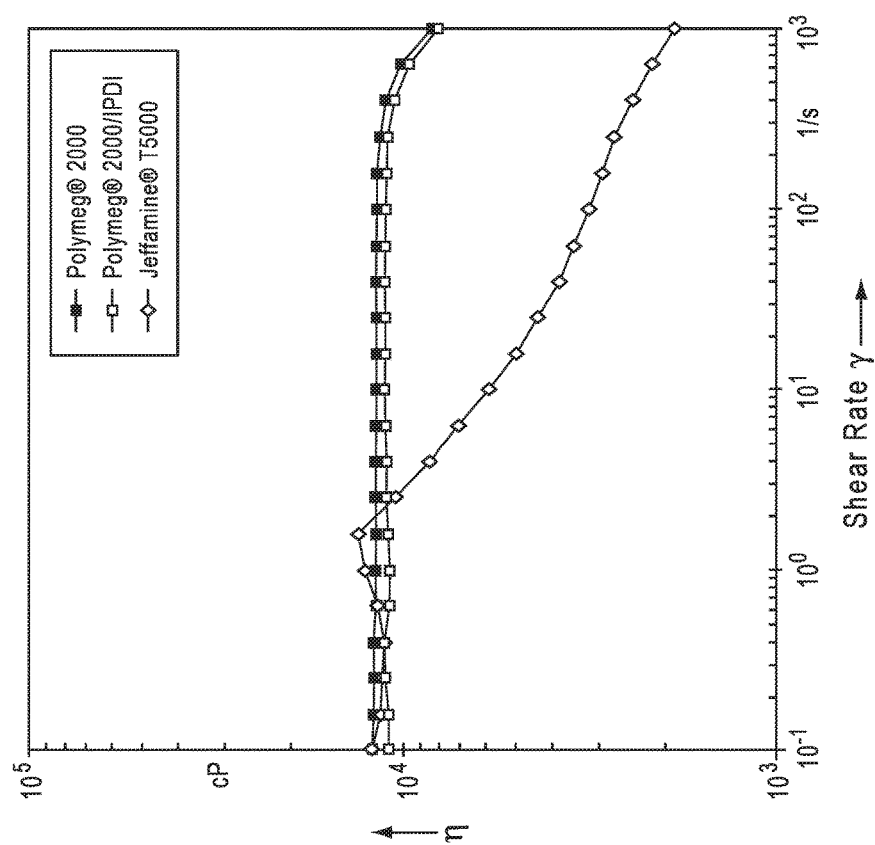
FIG. 6 is a graph showing the dependence of the viscosity $\eta$ (cP) on the shear rate $\gamma$ ($sec^{-1}$) for three (3) prepolymers.

FIG. 6 shows the shear dependent viscosity for six (6) prepolymers. Polymeg® 2000, IPDI-terminated Polymeg® 2000, and Jeffamine® T-5000 have similar viscosities at shear rates from 0.1 sec$^{-1}$ to about 2 sec$^{-1}$.

For polyurea curing chemistries in additive manufacturing it can be useful for the a coreactive composition to have a viscosity within a range from $0.7 \times 10^4$ cP to $0.1.3 \times 10^4$ cP, from $0.8 \times 10^4$ cP to $1.2 \times 10^4$ cP, or from $0.9 \times 10^4$ cP to $1.1 \times 10^4$ cP, measured using an Anton Paar MCR 301 or 302 rheometer with a gap set to 1 mm, with a 25 mm-diameter parallel plate spindle, and an oscillation frequency of 1 Hz and amplitude of 0.3%.

The high viscosity and low gel time of the Jeffamine®-derived prepolymer, Jeffamine® T-500 in FIG. 6, may can also be due to the presence of pendent hydroxyl groups that can increase the hydrogen bonding between prepolymers.

Throughout an additively printed object, different parts of an object may be formed using different proportions of the two coreactive components such that different parts of an object may be characterized by different material properties. For example, some parts of an object may be rigid and other parts of an object may be flexible.

It will be appreciated that the viscosity, reaction rate, and other properties of the coreactive components may be adjusted to control the flow of the coreactive components and/or the thermosetting compositions such that the deposited portions and/or the object achieves and retains a desired structural integrity following deposition. The viscosity of the coreactive components may be adjusted by the inclusion of a solvent, or the coreactive components may be substantially free of a solvent or completely free of a solvent. The viscosity of the coreactive components may be adjusted by the inclusion of a filler, or the coreactive components may be substantially free of a filler or completely free of a filler. The viscosity of the coreactive components may be adjusted by using components having lower or higher molecular weight. For example, a coreactive component may comprise a prepolymer, a monomer, or a combination of a prepolymer and a monomer. The viscosity of the coreactive components may be adjusted by changing the deposition temperature. The coreactive components may have a viscosity and temperature profile that may be adjusted for the particular deposition method used, such as mixing prior to deposition and/or ink-jetting. The viscosity may be affected by the composition of the coreactive components themselves and/or may be controlled by the inclusion of rheology modifiers as described herein.

It can be desirable that the viscosity and/or the reaction rate be such that following deposition of the coreactive components the composition retains an intended shape. For example, if the viscosity is too low and/or the reaction rate is too slow a deposited composition may flow in a way the compromises the desired shape of a finished object. Similarly, if the viscosity is too high and/or the reaction rate is too fast, the desired shape may be compromised.

For example, the coreactive components that are deposited together may each have a viscosity at 25° C. and a shear rate at 0.1 sec$^{-1}$ to 10$^2$ sec$^{-1}$ from 5,000 centipoise (cP) to 20,000 cP, from 6,000 cP to 15,000 cP, from 7,000 cP to 13,000 cP, or from 8,000 cP to 12,000 cP. Viscosity values are measured using an Anton Paar MCR 301 or 302 rheometer with a gap from 1 mm.

The rate of interlayer crosslinking between successive and adjacent layers of a deposited object can be controlled to facilitate interlayer reaction and thereby improve the interlayer strength. The rate of interlayer crosslinking can be controlled, for example, by adjusting the time between deposition of successive layers, adjusting the temperature, adjusting the concentration of a catalyst, and/or adjusting the components of the composition such as the amount of monomer and prepolymer. A deposited layer may be homogeneous or a deposited layer may be inhomogeneous. For an inhomogeneous layer, a cross-section of the layer may have different chemical compositions. For example to improve interlayer adhesion, a part of a layer may have an excess of a certain coreactive functionality that can then react with an excess of a coreactive functionality of an overlying layer. Similarly, to improve interlayer adhesion, a lower part of a layer may have an excess of a certain coreactive functionality that can then react with an excess of a coreactive functionality of an underlying layer. To improve interlayer adhesion, a tie coating, film, or layer may be applied or deposited over a deposited layer prior to or during deposition of an overlying layer.

The coreactive components may include a first component having at least two functional groups per molecule (referred to as the "A" functional groups) and a second component having at least two functional groups per molecule (referred to as the "B" functional groups), where the A functional groups and the B functional groups are coreactive with each other, are different from each other, and at least one of the two coreactive components includes a saturated functional group.

A "saturated functional group" refers to a functional group of component coreactive component that does not include an unsaturated reactive group, although there may be unsaturation in other (non-reactive) portions of the compound of the coreactive component. An example of a saturated group includes thiol groups and an example of an unsaturated group includes alkenyl and acrylate groups. Examples of saturated functional groups include thiol, hydroxyl, primary amine, secondary amine, and epoxy groups. In certain compositions, a saturated functional group can be a thiol, a primary amine, a secondary amine, or a combination of any of the foregoing. In certain compositions, a saturated functional group can be a thiol, a primary amine, a secondary amine, an epoxy, or a combination of any of the foregoing. Examples of unsaturated functional groups include alkenyl groups, activated unsaturated groups such as acrylate, maleic, or fumaric acid groups, isocyanate groups, acyclic carbonate groups, acetoacetate groups, carboxylic acid groups, Michael acceptor groups, vinyl ether groups, (meth)acrylate groups, and malonate groups.

In certain compositions a saturated group comprises amine groups, and an unsaturated group comprise isocyanate groups.

Compositions provided by the present disclosure can comprise a first component comprising a first functional group, and a second component comprising a second functional group, wherein the second functional group is reactive with the first functional group, and both of the functional groups do not comprise ethylenically unsaturated groups. Examples of ethylenically unsaturated groups include (meth)acrylate groups, Michael acceptor groups, and vinyl ether groups.

In certain compositions provided by the present disclosure the first component and the second component do not include a polyisocyanate and a polyol.

B functional groups may be capable of reacting with the A functional groups at moderate temperature such as less than 140° C., less than 100° C., less than 60° C., less than 50° C., less than 40° C., less than 30° C., or less than 25° C. The A and B functional groups may react together at room temperature such as 20° C. One or both of the coreactive components may have on average more than two reactive groups per molecule, in which case the mixture of coreactive components comprises a thermosetting composition. Suitable coreactive functional groups are described, for example, in Noomen, Proceedings of the XIIIth International Conference in Organic Coatings Science and Technology, Athens, 1987, page 251; and in Tillet et al., *Progress in Polymer Science,* 36 (2011), 191-217, which is incorporated by reference in its entirety. The reaction between the A groups and the B groups may not involve the elimination of a by-product. Such reactions are often referred to as addition reactions. Examples of suitable coreactive functional groups A and B are listed in Table 1.

TABLE 1

Functional Groups.

| Functional Groups A | Functional Groups B |
| --- | --- |
| Carboxylic acid | Epoxy |
| Activated unsaturated groups such as acrylate, maleic or fumaric | Primary or secondary amine |
| Isocyanate | Primary or secondary amine |
| Isocyanate | Hydroxyl |
| Cyclic carbonate | Primary or secondary amine |
| Acetoacetate | Primary or secondary amine |
| Epoxy | Primary or secondary amine |
| Thiol | Alkenyl |
| Thiol | Vinyl ether |
| Thiol | (Meth)acrylate |
| Activated unsaturated groups such as acrylate or maleic | Malonate |

A first coreactive component may include compounds having more than one type of functional group A, and the second coreactive component may include components having more than one type of functional group B, such that an additive manufacturing material can comprise at least two sets of coreactive A and B groups, wherein at least one coreactive component has a functional group that is saturated. For example, a first coreactive component may have hydroxyl groups and secondary amine groups (i.e. at least two different functional groups) and the second coreactive component may have isocyanate groups. One or both of the coreactive components may optionally comprise a catalyst for the reaction between the A groups and the B groups.

The A groups and the B groups may be attached to any suitable compound such as a monomer and/or a prepolymer. Optionally, the A groups and the B groups may be attached to an oligomer, polymer, or prepolymer such as polyester, polyurethane, or acrylic oligomer, polymer, or prepolymer. In general, monomers refer to compounds without repeating units in the backbone, and can be characterized, for example, by a molecular weight less than 600 Daltons, less than 500 Daltons, or less than 400 Daltons. In general, a prepolymer refers to a compound having repeat units in backbone and can be characterized, for example, by a molecular weight from 1,000 Daltons to 20,000 Daltons, from 1,000 Daltons to 10,000 Daltons, or from 2,000 Daltons to 5,000 Daltons.

The functional groups A and B may be terminal groups and/or pendent groups. A coreactive component can have a functionality of two or a functionality greater than two, such as a functionality from 2 to 6. Each functional group of a coreactive component can be the same or certain functional groups of a coreactive component can be different. For example, a coreactive component can have more than one different type of functional group reactive with an isocyanate, such as a primary amine group, a secondary amine group, or a hydroxyl group.

In a composition comprising at least two coreactive components, the first component can comprise a polyamine and the second component can comprise a polyisocyanate; the first component can comprise a polyalkenyl compound and the second component can comprise a polythiol; the first component can comprise a Michael addition acceptor and the second component can comprise a Michael addition donor; or a combination of any of the foregoing; In a composition comprising at least two coreactive components, the first component can comprise an isocyanate-functional prepolymer; and the second functional group can comprise a primary amine, a secondary amine, a hydroxyl, or a combination of any of the foregoing.

A composition for additive manufacturing can comprise a first component comprising a first functional group, and a second component comprising a second functional group, wherein the first and second functional groups are reactive with each other, and at least one of the first functional group and the second functional group comprise a saturated functional group. One of the first and second functional groups may be an unsaturated functional group, or both the first and second functional groups may be a saturated functional group. Both the first functional group and the second functional groups are not unsaturated functional groups. A composition provided by the present disclosure may contain additional coreactive components, which may comprise saturated and/or unsaturated functional groups.

The coreactive functional groups can react to form covalent bonds. The reaction between the coreactive functional groups can be catalyzed by a catalyst. In certain compositions, the reaction between the coreactive functional groups does not involve a free-radical initiated reaction. Compositions provided by the present disclosure may be thermoset compositions.

Compositions provided by the present disclosure may include two coreactive components or more than two coreactive components. A reactive component can comprise a combination of reactive components having the same functional group, such as a combination of monomers and prepolymers having the same functional group. An additional coreactive component can comprise a compound having a different functional group reactive with a first functional group or the second functional group. An additional coreactive component can impart an additional property to the composition. For example, the reaction rate of the additional coreactive component with one of the other coreactive components may be rapid and thereby facilitate the ability of a deposited layer to maintain a desired shape before the other components fully cure.

The first component and the second component can be combined in a suitable ratio to form a curable composition. For example, the functional Group A to functional Group B equivalent ratio of a curable composition can be from 1:1 to 1.5:1, from 1:1 to 1.45:1, from 1:1 to 3:1, from 1.2:1 to 1.5:1, or from 1.2:1 to 1.4:1. A suitable functional Group A to functional Group B equivalent ratio of a curable composition can be, for example, from 2:1 to 1:2, from 1.5:1 to 1:1.5, or from 1.1:1 to 1:1.1.

Compositions provided by the present disclosure can include one or both of the coreactive components such that the ratio of coreactive components in one portion of the object differs from the ratio of coreactive components in another part of the object. In this manner, portions of an object may have differing final compositions. The different compositions may differ by the weight percent of the coreactive compositions, the equivalent ratio of reactive monomers or reactants within the coreactive compositions, the type and/or level of filler, the crosslinking density, and/or properties such as glass transition temperature. Accordingly, one portion of an object produced in the three-dimensional printing may have different material properties such as different chemical, physical, thermal, or material properties than those of another portion of the three-dimensional object.

In addition, one portion of an object may partially react with at least some other coreactive components in an adjacent portion of the object. Such reaction may occur during deposition and/or after the coreactive components are deposited in each adjacent portion, whereby the coreactive components react in part within each adjacent portion and the coreactive components between adjacent portions react. In this manner, the deposited portions of an object may be covalently bound together as the coreactive compositions react between the portions of the object, thereby increasing the physical and structural integrity of the three-dimensional object. For example, unreacted isocyanate and/or amine groups present on the surface of an underlying deposited layer, can react with unreacted groups of a subsequently deposited layer. This increases the strength/integrity of the object by providing reaction between layers of deposited material, in addition to reaction within the same layer.

An additively manufactured object can include layers formed from a thermosetting or coreactive composition, such as a polyurea composition, that is produced from at least two deposited coreactive components and which may be crosslinked. In the case of polyurea, one of the coreactive components may include an isocyanate-functional prepolymer or oligomer and another coreactive component may include an amine such as a primary or secondary amine. The isocyanate-functional coreactive components may further include isocyanate-functional monomers. The amine containing coreactive component may further include another reactant with functional groups reactive with the isocyanate-functional prepolymer, oligomer, and/or monomer such as hydroxyl groups. Adjacent portions of a printed three-dimensional object may be reacted with some of the coreactive compositions in one or more adjacent portions.

For a polyurea composition, the coreactive components may include an isocyanate-functional component that may include polyisocyanate monomers, prepolymers, oligomers, adducts, polymers, or a blend of polyisocyanates. A polyisocyanate prepolymer can be a polyisocyanate which is pre-reacted with a sufficient amount of polyamine(s) or other isocyanate-reactive components such as one or more polyols, so that reactive isocyanate sites on the polyisocyanate remain in the isocyanate-functional prepolymer.

A polyisocyanate can include a polyisocyanate prepolymer prepared by reacting a prepolymer having terminal groups reactive with isocyanate groups with a polyisocyanate such as a diisocyanate. For example, a polyisocyanate prepolymer can be prepared by reacting a polyol prepolymer and/or a polyamine prepolymer with a polyisocyanate such as a diisocyanate.

Suitable monomeric polyisocyanates include, for example, isophorone diisocyanate (IPDI), which is 3,3,5-trimethyl-5-isocyanato-methyl-cyclohexyl isocyanate; hydrogenated diisocyanates such as cyclohexylene diisocyanate, 4,4'-methylenedicyclohexyl diisocyanate ($H_{12}$MDI); mixed aralkyl diisocyanates such as tetramethylxylyl diisocyanates, OCN—C(—$CH_3$)$_2$—$C_6H_4$C($CH_3$)$_2$—NCO; and polymethylene isocyanates such as 1,4-tetramethylene diisocyanate, 1,5-pentamethylene diisocyanate, 1,6-hexamethylene diisocyanate (HMDI), 1,7-heptamethylene diisocyanate, 2,2,4- and 2,4,4-trimethylhexamethylene diisocyanate, 1,10-decamethylene diisocyanate and 2-methyl-1,5-pentamethylene diisocyanate.

Aliphatic isocyanates can be useful in producing three-dimensional polyurea objects that are resistant to degradation by UV light. However, in other circumstances, less costly aromatic polyisocyanates may be used when durability is not of significant concern. Examples of monomeric aromatic polyisocyanates include phenylene diisocyanate, toluene diisocyanate (TDI), xylene diisocyanate, 1,5-naphthalene diisocyanate, chlorophenylene 2,4-diisocyanate, bitoluene diisocyanate, dianisidine diisocyanate, tolidine diisocyanate and alkylated benzene diisocyanates generally; methylene-interrupted aromatic diisocyanates such as methylenediphenyl diisocyanate, especially the 4,4'-isomer (MDI) including alkylated analogs such as 3,3'-dimethyl-4,4'-diphenylmethane diisocyanate and polymeric methylenediphenyl diisocyanate.

Suitable polyisocyanates also include polyisocyanates prepared from dimers and trimers of diisocyanate monomers. Dimers and trimers of diisocyanate monomers can be prepared, for example, by methods described in U.S. Pat. No. 5,777,061 at column 3, line 44 through column 4, line 40, which is incorporated by reference in its entirety. Dimers and trimers of diisocyanate monomers may contain linkages selected from isocyanurate, uretdione, biuret, allophanate and combinations thereof, such as Desmodur® N3600, Desmodur® CP2410, and Desmodur® N3400, available from Bayer Material Science.

A polyisocyanate can also comprise a polyisocyanate prepolymer. For example, a polyisocyanate can include an isocyanate-terminated polyether diol, an isocyanate-terminated extended polyether diol, or a combination thereof. An extended polyether diol refers to a polyether diol that has been reacted with an excess of a diisocyanate resulting in an isocyanate-terminated polyether prepolymer with increased molecular weight and urethane linkages in the backbone. Examples of polyether diols include Terathane® polyether diols such as Terathane® 200 and Terathane® 650 available from Invista or the PolyTHF® polyether diols available from BASF. Isocyanate-terminated polyether prepolymers can be prepared by reacting a diisocyanate and a polyether diol as described in U.S. Application Publication No. 2013/0244340, which is incorporated by reference in its entirety. The number average molecular weight of an extended isocyanate-terminated prepolymer can be, for example, from 250 Daltons to 10,000 Daltons, or from 500 Daltons to 7,500 Daltons.

A polyisocyanate prepolymer can include an isocyanate-terminated polytetramethylene ether glycol such as polytetramethylene ether glycols produced through the polymerization of tetrahydrofuran. Examples of suitable polytetramethylene ether glycols include Polymeg® polyols (LyondellBasell), PolyTHF® polyether diols (BASF), or Terathane® polyols (Invista).

A polyisocyanate prepolymer can include an isocyanate-terminated polyetheramine. Examples of polyether amines include Jeffamine® polyetheramines (Huntsman Corp.), and polyetheramines available from BASF. Examples of suitable polyetheramines include polyoxypropylenediamine.

A polyisocyanate prepolymer can include a difunctional isocyanate, a trifunctional isocyanate, a difunctional isocyanate-terminated prepolymer, an extended difunctional isocyanate-terminated prepolymer, or a combination of any of the foregoing.

The amine-functional coreactive component used to produce a three-dimensional polyurea object may include primary and/or secondary amines or mixtures thereof. The amines may be monoamines, or polyamines such as diamines, triamines, higher polyamines and/or mixtures thereof. The amines also may be aromatic or aliphatic such as cycloaliphatics. Examples of suitable aliphatic polyamines include, ethylene diamine, 1,2-diaminopropane, 1,4-diaminobutane, 1,3-diaminopentane, 1,6-diaminohexane, 2-methyl-1,5-pentane diamine, 2,5-diamino-2,5-dimethylhexane, 2,2,4- and/or 2,4,4-trimethyl-1,6-diaminohexane, 1,11-diaminoundecane, 1,12-diaminododecane, 1,3- and/or 1,4-cyclohexane diamine, 1-amino-3,3,5-trimethyl-5-aminomethyl-cyclohexane, 2,4- and/or 2,6-hexahydrotolulene diamine, 2,4'- and/or 4,4'-di amino-dicyclohexyl methane, 5-amino-1,3,3-trimethylcyclohexanemethylamine (isophoronediamine), 1,3-cyclohexanebis(methylamine) (1,3 BAC), and 3,3'-dialkyl-4,4'-diaminodicyclohexyl methanes (such as 3,3'-dimethyl-4,4'-diaminodicyclohexyl methane and 3,3'-diethyl-4,4'-diaminodicyclohexyl methane), 2,4- and/or 2,6-diaminotoluene and 2,4'- and/or 4,4'-diaminodiphenyl methane, or mixtures thereof.

Suitable secondary amines include acrylates and methacrylate-modified amines. By "acrylate and methacrylate modified amines" includes both mono- and poly-acrylate modified amines as well as acrylate or methacrylate modified mono- or poly-amines. Acrylate or methacrylate modified amines can include aliphatic amines.

A secondary amine may include an aliphatic amine, such as a cycloaliphatic diamine. Such amines are available commercially from Huntsman Corporation (Houston, Tex.) under the designation of Jefflink™ such as Jefflink™ 754. The amine may be provided as an amine-functional resin. Such amine-functional resins may be a relatively low viscosity, amine-functional resins suitable for use in the formulation of high solids polyurea three-dimensional objects. An amine-functional resin may comprise an ester of an organic acid, for example, an aspartic ester-based amine-functional reactive resin that is compatible with isocyanates; e.g., one that is solvent-free. An example of such polyaspartic esters is the derivative of diethyl maleate and 1,5-diamino-2-methylpentane, available commercially from Bayer Corporation. PA under the trade name Desmophen™ NH1220. Other suitable compounds containing aspartate groups may be employed as well.

An amine-functional coreactive component also may include high molecular weight primary amines, such as polyoxyalkyleneamines. Polyoxyalkyleneamines contain two or more primary amino groups attached to a backbone, derived, for example, from propylene oxide, ethylene oxide, or a mixture thereof. Examples of such amines include polyoxypropylenediamine and glycerol tris[poly(propylene glycol), amine-terminated] ether such as those available under the designation Jeffamine™ from Huntsman Corporation. Such polyetheramines can have a molecular weight from 200 Daltons to 7,500 Daltons, such as, for example, Jeffamine™ D-230, D-400, D-2000, T-403 and T-5000.

An amine-functional coreactive component may also include an aliphatic secondary amine such as Clearlink® 1000, available from Dor-Ketal Chemicals, LLC.

An amine-functional coreactive component can comprise an amine-functional aspartic acid ester, a polyoxyalkylene primary amine, an aliphatic secondary amine, or a combination of any of the foregoing.

For a polyurea formed from coreactive components comprising an isocyanate and a (meth)acrylate amine reaction product of a monoamine and poly(meth)acrylate, the term "(meth)acrylate" denotes both the acrylate and the corresponding (meth)acrylate. The poly(meth)acrylate may be any suitable poly(meth)acrylate and mixtures thereof. A poly(meth)acrylate can include a di(meth)acrylate, a poly (meth)acrylate can comprise tri(meth)acrylate, or a poly (meth) acrylate can include tetra(meth)acrylate. Suitable di(meth)acrylates include, for example, ethylene glycol, di(meth)acrylate, 1,3-butylene glycol di(meth)acrylate, 1,4-butanediol di(meth)acrylate, 2,3-dimethylpropane 1,3-di (meth)acrylate, 1,6-hexanediol di(meth)acrylate, propylene glycol di(meth)acrylate, dipropylene glycol di(meth)acrylate, tripropylene glycol di(meth)acrylate, tetraethylene glycol di(meth)acrylate, tetrapropylene glycol di(meth)acrylate, ethoxylated hexanediol di(meth)acrylate, propoxylated hexanediol di(meth)acrylate, neopentyl glycol di(meth)acrylate, alkoxylated neopentyl glycol di(meth)acrylate, hexylene glycol di(meth)acrylate, diethylene glycol di(meth) acrylate, polyethylene glycol di(meth)acrylate, polybutadiene di(meth)acrylate, thiodiethyleneglycol di(meth)acrylate, trimethylene glycol di(meth)acrylate, triethylene glycol di(meth)acrylate, alkoxylated hexanediol di(meth)acrylate, alkoxyolated neopentyl glycol di(meth) acrylate, pentanediol di(meth)acrylate, cyclohexane dimethanol di(meth)acrylate, ethoxylated bis-phenol A di(meth) acrylate, and combinations of any of the foregoing. Examples of tri and higher (meth)acrylates include glycerol tri(meth)acrylate, trimethylolpropane tri(meth)acrylate, ethoxylated trimethylolpropane tri(meth)acrylate, propoxylated trimethylolpropane tri(meth)acrylate, ditrimethylolpropane tetra(meth)acrylate, pentaerythritol tetra(meth) acrylate, ethoxylated pentaerythritol tetra(meth)acrylate, propoxylated pentaerythritol tetra(meth)acrylate, and dipentaerythritol penta(meth)acrylate. Other suitable poly(meth) acrylate oligomers include (meth)acrylate of epoxidized soya oil and urethane acrylates of polyisocyanates and hydroxyalkyl (meth)acrylates. Mixtures of poly(meth)acrylate monomers may also be used, including mixtures of mono, di, tri, and/or tetra (meth)acrylate.

Other suitable poly(meth)acrylates include urethane (meth)acrylates such as those formed from the reaction of hydroxyl-functional (meth)acrylate with a polyisocyanate or with an isocyanate-functional adduct of a polyisocyanate and a polyol or a polyamine. Suitable hydroxyl-functional (meth)acrylates include 2-hydroxyethyl, 1-methyl-2-hydroxyethyl, 2-hydroxypropyl, 2-hydroxybutyl, 4-hydroxybutyl, and the like. Suitable polyisocyanates include, for example, any of the monomeric or oligomeric isocyanates, or isocyanate prepolymers disclosed herein.

A thermosetting or coreactive composition provided by the present disclosure can be based on thiol-ene chemistry. For example, a thermosetting composition provided by the present invention having thiol-ene functionality may include a polyene coreactive component comprising compounds or prepolymers having terminal and/or pendent olefinic double bonds, such as terminal alkenyl groups. Examples of such compounds include (meth)acrylic-functional (meth)acrylic copolymers, epoxy acrylates such as epoxy resin (meth) acrylates (such as the reaction product of bisphenol A diglycidyl ether and acrylic acid), polyester (meth)acrylates, polyether (meth)acrylates, polyurethane (meth)acrylates, amino (meth)acrylates, silicone (meth)acrylates, and melamine (meth)acrylates.

Examples of suitable polyurethane (meth)acrylates include reaction products of polyisocyanates such as 1,6-hexamethylene diisocyanate and/or isophorone diisocyanate including isocyanurate and biuret derivatives thereof with hydroxyalkyl (meth)acrylates such as hydroxyethyl (meth) acrylate and/or hydroxypropyl (meth)acrylate. Examples of suitable polyester (meth)acrylates are the reaction products of (meth)acrylic acid or anhydride with polyols, such as diols, triols and tetraols, including alkylated polyols, such as propoxylated diols and triols. Examples of suitable polyols include 1,4-butane diol, 1,6-hexane diol, neopentyl glycol, trimethylol propane, pentaerythritol and propoxylated 1,6-hexane diol. Examples of suitable polyester (meth)acrylates include glycerol tri(meth)acrylate, trimethylolpropane tri (meth)acrylate, pentaerythritol tri(meth)acrylate, and pentaerythritol tetra(meth)acrylate. Mixtures of polyurethane (meth)acrylates and polyester (meth)acrylates may be used.

In addition to (meth)acrylates, (meth)allyl compounds or prepolymers may be used either alone or in combination with (meth)acrylates. Examples of (meth)allyl compounds include polyallyl ethers such as the diallyl ether of 1,4- butane diol and the allyl ether of trimethylol propane. Examples of other (meth)allyl compounds include polyurethanes containing (meth)allyl groups. For example, reaction products of polyisocyanates such as 1,6-hexamethylene diisocyanate and/or isophorone diisocyanate including isocyanurate and/or biuret derivatives thereof with hydroxyl-functional allyl ethers, such as the monoallyl ether of 1,4-butane diol and the diallylether of trimethylol propane can be used.

Isocyanate functionality may be incorporated into a coreactive component in a number of ways. The polyurethane (meth)acrylate or the polyurethane (meth)allyl compound may be prepared in a manner such that the reaction product contains unreacted isocyanate groups. For example, the above-mentioned reaction product of 1,6-hexamethylene diisocyanate and/or isophorone diisocyanate with hydroxyethyl (meth)acrylate and/or hydroxypropyl (meth)acrylate are reacted in an NCO/OH equivalent ratio of greater than 1. Alternately, such reaction products may be prepared such that they are isocyanate free, i.e., NCO/OH equivalent ratio equal to or less than 1, and a separate isocyanate compound such as a polyisocyanate may be included in the coreactive component.

A polythiol coreactive component refers to polyfunctional compounds containing two or more thiol-functional groups (—SH). Suitable polythiol-functional compounds include polythiols having at least two thiol groups including monomers and prepolymers. A polythiol may have ether linkages (—O—), thioether linkages (—S—), including polysulfide linkages (—$S_x$—), where x is at least 2, such as from 2 to 4, and combinations of such linkages.

Examples of suitable polythiols include compounds of the formula $R^1$—$(SH)_n$, where $R^1$ is a polyvalent organic moiety and n is an integer of at least 2, such as from 2 to 6.

Examples of suitable polythiols include esters of thiol-containing acids formed by reacting a thiol-containing acid of formula HS—$R^2$—COOH where $R^2$ is an organic moiety with a polyhydroxyl compounds of the structure $R^3$—$(OH)_n$ where $R^3$ is an organic moiety and n is at least 2, such as from 2 to 6. These components may be reacted under suitable conditions to give polythiols having the general structure $R^3$—$(OC(O)$—$R^2$—$SH)_n$ wherein $R^2$, $R^3$ and n are as defined above.

Examples of thiol-containing acids include thioglycolic acid (HS—$CH_2COOH$), α-mercaptopropionic acid (HS—CH($CH_3$)—COOH) and β-mercaptopropionic acid (HS—$CH_2CH_2COCH$) with polyhydroxy compounds such as glycols, triols, tetraols, pentaols, hexaols, and combinations of any of the foregoing. Other suitable polythiols include ethylene glycol bis(thioglycolate), ethylene glycol bis(β-mercaptopropionate), trimethylolpropane tris(thioglycolate), trimethylolpropane tris(β-mercaptopropionate), pentaerythritol tetrakis(thioglycolate) and pentaerythritol tetrakis(β-mercaptopropionate), and combinations of any of the foregoing.

Certain thermosetting compositions provided by the present disclosure may employ Michael addition reactive components. The reactive components may include primary amine-functional components and acrylate, maleic, or fumaric-functional components. Compounds that are useful primary amine-functional components include polyoxyalkyleneamines containing two or more primary amine groups attached to a backbone, derived, for example, from propylene oxide, ethylene oxide, or a mixture thereof. Examples of such amines include those available under the designation Jeffamine™ from Huntsman Corporation. Such amines can have a molecular weight ranging from 200 Daltons to 7500 Daltons, such as, for example, Jeffamine™ D-230, D-400, D-2000, T-403, and T-5000. Compounds useful as acrylate functional components include the acrylate functional components listed previously as embodiments of (poly)methacrylate. Compounds useful as maleic or fumaric components include polyesters prepared from maleic anhydride, maleic acid, fumaric acid, or their corresponding $C_{1-6}$ alkyl esters.

A Michael acceptor group refers to an activated alkenyl group such as an alkenyl group proximate to an electron-withdrawing group such as a ketone, nitro, halo, nitrile, carbonyl, or nitro group. Examples of Michael acceptor groups include vinyl ketone, vinyl sulfone, quinone, enamine, ketimine, aldimine, oxazolidine, acrylate, acrylate esters, acrylonitrile, acrylamide, maleimide, alkylmethacrylates, vinyl phosphonates, and vinyl pyridines.

Suitable examples of catalysts for Michael addition chemistries include tributylphosphine, triisobutylphosphine, tri-tertiary-butylphosphine, trioctyl phosphine, tris(2,4,4-trimethylpentyl)phosphine, tricyclopentylphosphine, tricyclohexalphosphine, tri-n-octylphosphine, tri-n-dodecylphosphine, triphenyl phosphine, and dimethyl phenyl phosphine.

Thermosetting compositions used in producing three-dimensional objects can include various additives such as rheology modifiers (e.g., silica or other fillers), flow control agents, plasticizers, stabilizers, wetting agents, dispersing auxiliaries, deformers, and adhesion promoters. In addition, three-dimensional printing of a thermosetting composition can include deposition of a thermosetting composition within a mold to provide temporary structural integrity to the object during the printing process.

Because the thermosetting compositions can have a low viscosity compared to thermoplastic compositions it is possible to use high filler concentrations. The high filler concentrations can be used to modify the properties of the finished object such as the mechanical, thermal, and/or electrical properties of the finished object. Thus, the use of high filler concentrations facilitated by the use of three-dimensional thermosetting compositions can greatly expand the design possibilities of three-dimensional printing. Furthermore, thermosetting compositions can be provided having superior solvent and chemical resistance.

Examples of suitable fillers include fumed silica such as Cabosil® TS720 available from Cabot Corporation and precipitated silica such as Lo-Vel®™ or Hi Sil® silicas available from PPG Industries. A curable composition provided by the present disclosure can comprise, for example, from 1 wt % to 40 wt % filler, from 1 wt % to 30 wt % filler, from 1 wt % to 25 wt % filler, from 5 wt % to 25 wt % filler, or from 10 wt % to 20 wt % filler, where wt % is based on the total weight of the curable composition. A filler may be included in the A component of a two-part system, may be included in the B part of a two-component system, or a filler may be included in both the A part and the B part.

A filler can be a low density filler characterized by, for example, a specific gravity less than 0.7, less than 0.3, or less than 0.1. Use of a low density filler can provide a three-dimensional printed object having a low specific gravity, such as from 0.8 to 1, or from 0.7 to 0.9.

A filler can be an electrically-conductive filler and can be used to impart electrically conductivity and/or EMI/RFI shielding effectiveness to a three-dimensional printed object. For example, an electrically conductive printed object can be characterized by a sheet resistance less than 0.5 $\Omega/cm^2$ or less 0.15 $\Omega/cm^2$. For example, an electrically conductive printed object can provide effective EMI/RFI over a frequency range from 1 MHz to 18 GHz, or a subrange between 1 MHz to 18 GHz.

Suitable fillers also include magnetic fillers and opaque fillers.

A coreactive composition can also include a reactive rheological modifier such as a polyethylene, a polyethylene or a propylene/ethylene copolymer. Examples of suitable propylene/ethylene copolymers include Petrolite® 5000 (Baker Hughes)

A coreactive composition can comprise a low molecular weight monomeric polyamine such as a polyamine having a molecular weight from 200 Daltons to 500 Daltons. Suitable monomeric polyamine include aliphatic polyamines, secondary aliphatic polyamines, and combinations thereof.

The polyamine component of a coreactive composition can comprise a secondary aliphatic diamine and a propylene/ethylene copolymer.

The polyisocyanate component can comprise, for example, from 80 wt % to 100 wt % of a polyisocyanate prepolymer, from 85 wt % to 95 wt %, or from 80 wt % to 90 wt %, wherein wt % is based on the total weight of the polyisocyanate component.

The polyamine component can comprise, for example, from 10 wt % to 30 wt % of a monomeric polyamine having a molecular weight from 200 Daltons to 500 Daltons; from 40 wt % to 90 wt % of a polyamine prepolymer having a molecular weight from 3,000 Daltons to 7,000 Daltons; and from 1 wt % to 20 wt % of a reactive rheological modifier, wherein wt % is based on the total weight of the polyamine component. The polyamine component can comprise, for example, from 15 wt % to 25 wt % of a monomeric polyamine having a molecular weight from 200 Daltons to 500 Daltons; from 50 wt % to 80 wt % of a polyamine prepolymer having a molecular weight from 3,000 Daltons to 7,000 Daltons; and from 5 wt % to 15 wt % of a reactive rheological modifier, wherein wt % is based on the total weight of the polyamine component.

The polyisocyanate prepolymer can comprise an isophorone diisocyanate-terminated polytetramethylene prepolymer; and the polyamine prepolymer can comprise a polyetheramine prepolymer.

The polyamine component can comprise from 0.1 wt % to 20 wt % of a filler, where wt % is based on the total weight of the polyamine component. The polyamine component can comprise from 0.1 wt % to 20 wt % of hydrophilic fumed silica, where wt % is based on the total weight of the polyamine component.

The polyisocyanate component and/or the polyamine component can be combined and extruded at room temperature. The polyisocyanate component and/or the polyamine component can be heated prior to combination in the static and/or dynamic mixer. The static and/or dynamic mixer can be at room temperature or can be heated. Prior to mixing, the polyisocyanate component and/or the polyamine component can be heated to facilitate mixing of the various components. In some cases, sufficient heat can be generated during pumping such as progressive cavity pumping, to reduce the viscosity of the polyisocyanate component and/or the polyamine component to facilitate mixing of the various components.

Additively printed objects can be fabricated using the compositions provided by the present disclosure. An additively printed object can be fabricated by deposited successive layers of a compositions comprising coreactive components. The compositions can be deposited, for example, using extrusion or using inkjet printing techniques.

Extrusion of coreactive components is well known. The coreactive components can be mixed in a barrel head pushed under pressure through a suitably shaped nozzle. The extruded composition or extrusion can be characterized by a cross-sectional profile. The cross-sectional profile can be characterized by a constant ratio of the coreactive components or by a variable ratio of the coreactive components, where the ratio can refer to the mole % ratio of the coreactive components, by the equivalents ratio of the functional groups, the wt % ratio of the reactive components, or other useful ratio. An inhomogeneous composition across the cross-sectional profile of an extrusion can be useful to impart different properties to different parts of the profile. For example, it may be useful to impart solvent resistance or electrically conductive properties to the outer portion of a profile. To facilitate adhesion between adjacent or adjoining layers such as underlying or overlying layers, it may be useful to include an excess of one or more of the coreactive functional groups. For example, a top surface or a portion of a top surface of a layer may have an excess of a first coreactive functional group, and a bottom surface or a portion of a bottom surface of an overlying layer may have an excess of a second coreactive functional group, where the first and second coreactive functional groups are reactive with each other. In this way, formation of covalent bonding between the adjoining layers is facilitated and the physical integrity of a finished three-dimensional printed object can be increased.

The rate of the curing reaction between the coreactive components can also be controlled such that the reaction is not complete when a subsequent layer is deposited on an underlying layer. In this way, coreactive components of an overlying layer can react with the coreactive components of an underlying layer to increase the strength between layers. Coreactive thermoset materials with a high degree of cross-linking can also be used to provide high solvent and chemical resistance to the finished part.

The ability of an extruded curable composition to maintain structural integrity and support an overlying layer of the composition was quantified by correlating the shear storage modulus G', the shear loss modulus G", the tan δ (G"/G'), the complex viscosity [η*], and the viscosity, of the curable composition with the desired properties. Desired properties, also referred to as build criteria, include the ability to be deposited, the ability to maintain the shape of a deposited layer, the ability to support one or more overlying layers, and the ability to adhere or coreact with an adjacent layer. Desired properties also include parameters that impact the printability of a coreactive composition including the ability to extrude the coreactive composition from a dispensing apparatus at reasonable pressures and before the coreactive composition reaches a sufficiently high viscosity that the coreactive composition can no longer be dispensed.

The viscoelasticity of a curable composition can be determined using a rotational rheometer to measure the shear storage modulus G' and the shear loss modulus G". For purposes of the present disclosure, values for the shear storage modulus G' and the shear loss modulus G" are measured using an Anton Paar MCR 301 or 302 rheometer with a gap set to 1 mm, with a 25 mm-diameter parallel plate spindle, and an oscillation frequency of 1 Hz and amplitude of 0.3%. The tests are performed with the temperature of the rheometer plate set to be 25° C.

Other material properties that can but adjusted to establish properties suitable for coreactive additive manufacturing include, for example, the use of aromatic polyamines or aliphatic polyamines, the amount and proportion of hard and soft segments in the prepolymer backbone, the molecular weight and functionality of the prepolymer, the presence of non-reactive pendent groups, the presence of pendent hydroxyl groups, the glass transition temperature of the prepolymer, the reactivity of the isocyanate and amine groups, the amount and types of fillers used, the isocyanate to amine mix ration, the steric hindrance of the reactants, and a combination of any of the foregoing.

Three-dimensional objects printed according to methods provided by the present disclosure provide benefits over previous additively manufactured objects in both the process for producing the object and in the properties of final object. For example, the deposition methods may not require any use of added heat, therefore avoiding the creation of stress buildup in the finished object during cooling as can occur with three-dimensional printing of thermoplastic materials. The coreactive compositions provided by the present disclosure can have sufficiently low viscosity that the compositions may be pumped and printed quickly and accurately. By using coreactive compositions that react fast and remain in place following deposition, improved control over the shape and dimensions of a printed object may be realized. In addition, the coreactive compositions provided by the present disclosure may include materials that provide additional properties to the object such as magnetic or conductive including electrical and/or thermally conductive, properties, and strength. Strengthening components include, for example, carbon fiber, glass fiber, and graphene. Colorants such as pigments or dyes can also be included in a printing composition. For coreactive compositions that crosslink quickly, strength in the printed object allows for rapid addition of further layers on top of the previously printed portion of the object. Another benefit of the disclosed materials and methods is strength as provided in the "z direction" of the printed object, where the x and y direction are the general planes of the building of the three-dimensional object. Traditional three-dimensional printing provides minimal adhesion between layers of the printed object, particularly when thermoplastic materials are used. By providing material that forms covalent crosslinks between successive layers, the final printed object can have increased strength in the z direction.

Because the reaction product of coreactive materials can be adhesive the use of a low surface energy build surface may be appropriate. Low surface energy build surfaces include, for example, polyolefins and fluoropolymers. Alternatively, a build surface may be coated with a mold release agent such as those used in polyurethane injection molding.

The use of low viscosity coreactive or thermoset compositions can facilitate deposition at room temperature thereby avoiding the high temperature print heads characteristic of thermoplastic three-dimensional printing apparatus. The use of thermosetting materials can facilitate the use of simple and light weight print heads that can be moved rapidly and precisely and can further simplify the various drive mechanisms.

Depending in part on control of the rheology profile and cure rate of the thermosetting compositions, it is possible to rapidly build parts with high structural integrity. The structural strength between adjacent layers can also facilitate the ability to construct shapes that overhang an underlying layer.

The at least two coreactive components can be deposited from a single nozzle. In such cases the coreactive components can be mixed and deposited before the curing reaction significantly proceeds, or the coreactive components may have, for example, a sufficiently slow curing rate that they remain in liquid form following mixing. The slowly reacting components can be deposited and a catalyst can then be deposited from a separate nozzle to initiate the curing reaction between the two coreactive components. Rather than be deposited as large droplets, the coreactive components can be deposited as a spray. Deposition in the form of a spray can facilitate the ability of the two coreactive components to mix prior to deposition. Because reactive thermoset compositions can have low viscosities, compared to thermoplastic compositions, deposition using sprays can be facilitated.

ASPECTS OF THE INVENTION

Aspect 1. A method of reactive additive manufacturing, comprising: providing a first component comprising a first prepolymer into a first pump; providing a second component comprising a second prepolymer into a second pump, wherein the second prepolymer is reactive with the first prepolymer; pumping the first component from the first pump, and the second component from the second pump through a mixer to provide a reactive compositions; and depositing the reactive composition through a nozzle connected to the mixer.

Aspect 2. The method of aspect 1, wherein the first component comprises a polyisocyanate prepolymer; and the second component comprises a polyamine prepolymer.

Aspect 3. The method of any one of aspects 1 to 2, wherein each of the first pump and the second pump independently comprise a syringe pump, a peristaltic pump, or a progressive cavity pump.

Aspect 4 The method of any one of aspects 1 to 3, wherein each of the first pump and the second pump comprise a progressive cavity pump.

Aspect 5. The method of any one of aspects 1 to 4, wherein the mixer comprises a static mixer, a dynamic mixer, or a combination thereof.

Aspect 6. The method of any one of aspects 1 to 5, wherein the mixer comprises a static mixer.

Aspect 7. A reactive additive manufacturing composition, comprising: a first component comprising a polyisocyanate prepolymer and a first viscosity; and a second component comprising a polyamine prepolymer and a second viscosity, wherein the first viscosity is within ±20% of the second viscosity, wherein viscosity is measured using an Anton Paar MCR 301 or 302 rheometer with a 25 mm-diameter parallel plate spindle, an oscillation frequency of 1 Hz and amplitude of 0.3%, and with a rheometer plate temperature of 25° C.

Aspect 8. The composition of aspect 7, wherein the first viscosity is within ±10% of the second viscosity.

Aspect 9. The composition of any one of aspects 7 to 8, wherein the first component, the second component, or both the first component and the second component comprise from 0.1 wt % to 30 wt % of a filler, wherein wt % is based on the total weight of the first component, the second component, or both the first and second components, respectively.

Aspect 10. The composition of any one of aspects 7 to 9, wherein the filler comprises an inorganic filler, an organic filler, or a combination thereof.

Aspect 11. The composition of any one of aspects 7 to 10, wherein, the polyisocyanate prepolymer comprises a difunctional polyisocyanate prepolymer; and the polyamine prepolymer comprises a difunctional polyamine prepolymer.

Aspect 12. The composition of any one of aspects 7 to 12, wherein the polyisocyanate prepolymer comprises an isocyanate-terminated polytetramethylene prepolymer.

Aspect 13. The composition of any one of aspects 7 to 13, wherein the polyisocyanate prepolymer comprises an isophorone-terminated polytetramethylene prepolymer.

Aspect 14. The composition of any one of aspects 7 to 14, wherein the polyamine prepolymer comprises a trifunctional polyetheramine.

Aspect 15. The composition of any one of aspects 7 to 15, wherein the polyamine prepolymer comprising a difunctional polyamine, a trifunctional polyamine, or a combination thereof.

Aspect 16. The composition of any one of aspects 7 to 16, wherein the second component comprises a monomeric diamine and a rheology modifier.

Aspect 17. The composition of any one of aspects 7 to 17, wherein the second component comprises a secondary aliphatic diamine and a polyethylene/polypropylene copolymer.

Aspect 18. The composition of any one of aspects 7 to 18, wherein, the first component comprises from 80 wt % to 100 wt % of the polyisocyanate prepolymer, wherein wt % is based on the total weight of the first component; and the second component comprises: from 10 wt % to 30 wt % of a monomeric polyamine having a molecular weight within a range from 200 Daltons to 500 Daltons; from 40 wt % to 90 wt % of a polyamine prepolymer having a molecular weight within a range from 3,000 Daltons to 7,000 Daltons; and from 1 wt % to 20 wt % of a rheology modifier, wherein wt % is based on the total weight of the second component.

Aspect 19. The composition of aspect 18, wherein, the polyisocyanate prepolymer comprises an isophorone diisocyanate-terminated polytetramethylene prepolymer; and the polyamine prepolymer comprises a polyetheramine prepolymer.

Aspect 20. The composition of aspect 18, wherein, the polyisocyanate prepolymer comprises an isophorone diisocyanate-terminated polyetheramine prepolymer, such as an isophorone diisocyanate-terminated polyoxypropylenediamine prepolymer; and the polyamine prepolymer comprises a polyetheramine prepolymer.

Aspect 21. The composition of aspect 18, wherein, the polyisocyanate prepolymer comprises an isophorone diisocyanate-terminated polyoxypropylenediamine prepolymer; and the polyamine prepolymer comprises a polyetheramine prepolymer.

Aspect 22. The composition of any one of aspects 18 to 21, wherein, the monomeric amine comprises a secondary aliphatic diamine; and the rheology modifier comprises a propylene/ethylene copolymer.

Aspect 23. The composition of any one of aspects 18 to 22, wherein the second component comprises from 0.1 wt % to 20 wt % of a filler, wherein wt % is based on the total weight of the second component.

Aspect 24. The composition of any one of aspects 18 to 23, wherein the second component comprises from 0.1 wt % to 20 wt % of hydrophilic fumed silica wherein wt % is based on the total weight of the second component.

Aspect 25. The composition of any one of aspects 7 to 24, wherein the composition has an initial G"/G' ratio, immediately after mixing the first and second component, of greater than 2, wherein the shear storage modulus G' and the shear loss modulus G" are measured using a rheometer with a gap from 1 mm to 2 mm, with a 25 mm-diameter parallel plate spindle, an oscillation frequency of 1 Hz and amplitude of 0.3%, and with a rheometer plate temperature of 25° C.

Aspect 26. The composition of any one of aspects 7 to 25, wherein the composition has a G"/G' ratio at 7 minutes after mixing the first and second component of greater than 1, wherein the shear storage modulus G' and the shear loss modulus G" are measured using a rheometer with a gap from 1 mm to 2 mm, with a 25 mm-diameter parallel plate spindle, an oscillation frequency of 1 Hz and amplitude of 0.3%, and with a rheometer plate temperature of 25° C.

Aspect 27. The composition of any one of aspects 7 to 26, wherein the composition is characterized by a tack free time of greater than 3 minutes.

Aspect 28. An object formed using the composition of any one of aspects 7 to 27.

Aspect 29. The object of aspect 28, wherein the object comprises a plurality of layers, wherein adjacent layers forming the object are covalently bonded.

Aspect 30. A method of additive manufacturing, comprising extruding the composition of any one of aspects 7 to 27 using a two component progressive cavity pump.

Aspect 31. The method of aspect 30, wherein the method comprises extruding each of the first component and the second component into a mixer.

Aspect 32. The method of any one of aspects 30 to 31, wherein the method comprises extruding each of the first component and the second component into a mixer having an exit orifice diameter from 0.6 mm to 2.5 mm, and a length from 30 mm to 150 mm.

Aspect 33. The method of any one of aspects 30 to 32, wherein the method comprises extruding each of the first component and the second component into a mixer, wherein the composition has a residence time in the mixer within a range from 0.25 seconds to 5 seconds.

It should be understood that, where not mutually exclusive, the various features of the embodiments of the present disclosure described, shown and/or claimed herein may be used in combination with each other. In addition, the following Examples are presented to demonstrate the general principles of the methods and compositions provided by the present disclosure. All amounts listed are described in parts by weight, unless otherwise indicated. The invention should not be considered as limited to the specific Examples presented.

EXAMPLES

Example 1

Rheology Characterization

The rheology of three-dimensional printing formulations was determined using an Anton Paar 301 or 302 rheometer. Two-component (a polyamine component and; a polyisocyanate component) samples were dispensed using a ViscoTec ecoDUO 450 precision dosing system fitted with an in-line static mixer having an orifice diameter of 0.9 mm, a static mixing length of 16 turns, and a dispensing length of 2.54 cm, and then immediately deposited onto the rheometer to fill the sample gap (1 mL to 2 mL). A disposable sample plate (Anton Paar, Cat. No. 4847) was placed on the rheometer and used as the bottom plate in the measurements. A disposable parallel plate spindle with a diameter of 25 mm (PP25) was used for the measurements. The spindle was brought toward the sample immediately after loading, with the gap set at 1 mm. An oscillation measurement (frequency 1 Hz, amplitude 0.3%) was then applied. Rheological parameters (G', G", tan δ, |η*|) were recorded over time. The tests were performed under ambient condition with the temperature of the rheometer plate set to be 25° C. The results are shown in Table 1.

The polyamine component contained 66 wt % Jeffamine® T5000 (polyoxyalkylene primary amine (glycerol tris[poly (propylene glycol), amine terminated] ether) of approximately 5,000 MW, available from Huntsman Corp.), 19 wt % Clearlink® 1000 (aliphatic secondary amine, available from Dorf-Ketal Chemicals, LLC.), and 10 wt % Petrolite® 5000 (propylene/ethylene copolymer, available from Baker Hughes), where wt % is based on the total weight of the polyamine component The polyamine component further contained either 5 wt % or 8.5 wt % of Cabosil® TS-720 (fumed silica available from Cabot Corp.) filler.

The isocyanate component contained either the reaction product of 77 wt % Jeffamine® D-2000 (polyoxypropylenediamine) and 23 wt % isophorone diisocyanate; or the reaction product of 73 wt % Polymeg® 2000 (polytetramethylene ether glycol) and 27 wt % isophorone diisocyanate, where wt % is based on the total weight of the composition.

TABLE 1

Dynamic modulus parameters for the polyurea formulations.

| Formulation | Isocyanate Component | Filler wt % Cabosil® TS-720 | G' t = 0 | G" t = 0 | G"/G' | δ |
|---|---|---|---|---|---|---|
| A1 | Polymeg® 2000/IPDI | 5 | 762 | 2050 | 2.69 | 69.61 |
| A2 | Polymeg® 2000/IPDI | 5 | 3500 | 8500 | 2.43 | 67.62 |
| B | Polymeg® 2000/IPDI | 8.5 | 654 | 3110 | 4.76 | 78.12 |
| C1 | Jeffamine® D2000/IPDI | 5 | 102 | 342 | 3.35 | 73.39 |
| C2 | Jeffamine® D2000/IPDI | 5 | 120000 | 120000 | 1.00 | 45.00 |
| D | Jeffamine® D2000/IPDI | 8.5 | 8330 | 9390 | 1.13 | 48.42 |

Formulations A1, A2, B and D could be successfully printed.

Formulations C1 and C2 cured too fast and clogged the dispensing nozzle. The large variability in the G' and G" values for C1 and C2 are an artifact of the rapid curing. Compositions C1 and C2 are the same, however, because the C1 and C2 compositions cure very fast it is difficult to establish t=0, which results in a large apparent variability in the initial G' and G" values. Increasing the filler content from 5 wt % to 8.5 wt % slowed the curing rate so that the Jeffamine® D-2000/IPDI composition could be successfully printed.

Example 2

Tack-Free Times

A hand pump was used to extrude the polyurea formulations of Example 1. The Jeffamine® D2000 formulations (C1, C2, and D) were considerably more difficult to pump than the Polymeg® 2000 formulations (A1, A2, and B), and gelled in the nozzle quickly. The tack-free time was determined using a drawdown method at a 1-mil thickness. For the drawdown method 1-mil thick uniform film was applied the length of an 8½-inch×11-inch (21.6-inch×27.94-inch) sheet of polyethylene using a square frame 8 path applicator #34 (Precision Gage & Tool Co.). About 10 mL of the polyurea formulation was extruded within the boundaries of the applicator, which was coated with Chem Trend MR-515 release agent to prevent curing on the applicator. When the film is drawn down, a cotton ball is gently pressed against the film and removed (a dab). The quantity of adhered cotton is visually monitored as the cotton ball is repeatedly dabbed against the film without dabbing the same area more than once. As the quantity of adhere cotton decreases, the frequency of dabbing increases, such that the dabbing interval is no longer than 5 sec when there is almost no cotton adhered to the film. The time recorded from when the film is drawn down until no cotton adheres to the film is the tack-free time. The results are shown in Table 2.

TABLE 2

Tack-free time of coreactive formulations.

| Sample | Polyisocyanate Prepolymer | Filler (wt %) Cabosil® TS-720 | Tack-Free Time (min:sec) |
|---|---|---|---|
| C1 | Jeffamine® D2000/IPDI | 5 wt % | 3:26 |
| D | Jeffamine® D2000/IPDI | 8.5 wt % | 2:48 |
| A1 | Polymeg® 2000/IPDI | 5 wt % | 4:47 |
| B1 | Polymeg® 2000/IPDI | 8.5 wt % | 5:39 |
| B2 | Polymeg® 2000/IPDI | 8.5 wt % | 5:36 |

Whereas particular embodiments of this invention have been described above for purposes of illustration, it will be evident to those skilled in the art that numerous variations of the details of the present invention may be made without departing from the invention as defined in the appended claims.

What is claimed is:

1. A reactive additive manufacturing composition, comprising:
   a first component comprising a polyisocyanate prepolymer and a first viscosity; and
   a second component comprising a polyamine prepolymer and a second viscosity,
   wherein the first viscosity is within ±20% of the second viscosity,
   wherein viscosity is measured using an Anton Paar MCR 301 or 302 rheometer with a 25 mm-diameter parallel plate spindle, an oscillation frequency of 1 Hz and amplitude of 0.3%, and with a rheometer plate temperature of 25° C.; and
   wherein the composition is characterized by a tack free time of greater than 3 minutes.

2. The composition of claim 1, wherein the first viscosity is within ±10% of the second viscosity.

3. The composition of claim 1, wherein the first component, the second component, or both the first component and the second component comprise from 0.1 wt % to 30 wt % of a filler, wherein wt % is based on the total weight of the first component, the second component, or both the first and second components, respectively.

4. The composition of claim 3, wherein the filler comprises an inorganic filler, an organic filler, or a combination thereof.

5. The composition of claim 1, wherein,
   the polyisocyanate prepolymer comprises a difunctional polyisocyanate prepolymer; and
   the polyamine prepolymer comprises a difunctional polyamine prepolymer.

6. The composition of claim 1, wherein the polyisocyanate prepolymer comprises an isocyanate-terminated polytetramethylene prepolymer.

7. The composition of claim 1, wherein the polyisocyanate prepolymer comprises an isophorone-terminated polytetramethylene prepolymer.

8. The composition of claim 1, wherein the polyamine prepolymer comprises a trifunctional polyetheramine.

9. The composition of claim 1, wherein the polyamine prepolymer comprises a difunctional polyamine, a trifunctional polyamine, or a combination thereof.

10. The composition of claim 1, wherein the second component comprises a monomeric diamine and a rheology modifier.

11. The composition of claim 1, wherein the second component comprises a secondary aliphatic diamine and a polyethylene/polypropylene copolymer.

12. The composition of claim 1, wherein,
the first component comprises from 80 wt % to 100 wt % of the polyisocyanate prepolymer, wherein wt % is based on the total weight of the first component; and
the second component comprises:
from 10 wt % to 30 wt % of a monomeric polyamine having a molecular weight within a range from 200 Daltons to 500 Daltons;
from 40 wt % to 90 wt % of a polyamine prepolymer having a molecular weight within a range from 3,000 Daltons to 7,000 Daltons; and
from 1 wt % to 20 wt % of a rheology modifier,
wherein wt % is based on the total weight of the second component.

13. The composition of claim 12, wherein,
the polyisocyanate prepolymer comprises an isophorone diisocyanate-terminated polytetramethylene prepolymer; and
the polyamine prepolymer comprises a polyetheramine prepolymer.

14. The composition of claim 12, wherein, the polyisocyanate prepolymer comprises an isophorone diisocyanate-terminated polyetheramine prepolymer; and the polyamine prepolymer comprises a polyetheramine prepolymer.

15. The composition of claim 12, wherein, the polyisocyanate prepolymer comprises an isophorone diisocyanate-terminated polyoxypropylenediamine prepolymer; and the polyamine prepolymer comprises a polyetheramine prepolymer.

16. The composition of claim 12, wherein,
the monomeric amine comprises a secondary aliphatic diamine; and
the rheology modifier comprises a propylene/ethylene copolymer.

17. The composition of claim 12, wherein the second component comprises from 0.1 wt % to 20 wt % of a filler, wherein wt % is based on the total weight of the second component.

18. The composition of claim 12, wherein the second component comprises from 0.1 wt % to 20 wt % of hydrophilic fumed silica wherein wt % is based on the total weight of the second component.

19. The composition of claim 1, wherein the composition has an initial G"/G' ratio, immediately after mixing the first and second component, of greater than 2, wherein the shear storage modulus G' and the shear loss modulus G" are measured using a rheometer with a gap from 1 mm to 2 mm, with a 25 mm-diameter parallel plate spindle, an oscillation frequency of 1 Hz and amplitude of 0.3%, and with a rheometer plate temperature of 25° C.

20. The composition of claim 1, wherein the composition has a G"/G' ratio at 7 minutes after mixing the first and second component of greater than 1, wherein the shear storage modulus G' and the shear loss modulus G" are measured using a rheometer with a gap from 1 mm to 2 mm, with a 25 mm-diameter parallel plate spindle, an oscillation frequency of 1 Hz and amplitude of 0.3%, and with a rheometer plate temperature of 25° C.

21. An object formed using the composition of claim 1.

22. The object of claim 21, wherein the object comprises a plurality of layers, wherein adjacent layers forming the object are covalently bonded.

23. A method of additive manufacturing, comprising extruding the reactive additive manufacturing composition of claim 1 using a two component progressive cavity pump.

24. The method of claim 23, wherein the method comprises extruding each of the first component and the second component into a mixer.

25. The method of claim 23, wherein the method comprises extruding each of the first component and the second component into a mixer having an exit orifice diameter from 0.6 mm to 2.5 mm, and a length from 30 mm to 150 mm.

26. The method of claim 23, wherein the method comprises extruding each of the first component and the second component into a mixer, wherein the composition has a residence time in the mixer within a range from 0.25 seconds to 5 seconds.

27. The composition of claim 1, wherein the composition comprises a rheology modifier.

28. The composition of claim 27, wherein the rheology modifier comprises a filler, a polymer, or a combination thereof.

29. The composition of claim 27, wherein the rheology modifier comprises a reactive rheology modifier.

30. The composition of claim 27, wherein the rheology modifier comprises polyethylene, a polyethylene/ethylene copolymer, a polypropylene/ethylene copolymer, or a combination of any of the foregoing.

31. The composition of claim 1, wherein the composition comprises low-density filler, electrically conductive filler, magnetic filler, opaque filler, an inorganic filler, an organic filler, or a combination of any of the foregoing.

32. The composition of claim 1, wherein the composition comprises from 1 wt % to 40 wt % of a filler, wherein wt % is based on the total weight of the composition.

33. The composition of claim 1, wherein the polyisocyanate prepolymer and the polyamine prepolymer independently have a molecular weight from 400 Daltons to 8,000 Daltons.

34. The composition of claim 1, wherein the first component comprises a polyisocyanate monomer and/or the second component comprises a polyamine monomer.

35. A method of additive manufacturing comprising extruding the reactive additive manufacturing composition of claim 1.

36. A method of reactive additive manufacturing using the composition of claim 1, comprising:
providing the first component into a first pump;
providing the second component into a second pump, wherein the second prepolymer is reactive with the first prepolymer;
pumping the first component from the first pump, and the second component from the second pump through a mixer to provide a reactive composition; and
depositing the reactive composition through a nozzle connected to the mixer.

37. The method of claim 36, wherein each of the first pump and the second pump independently comprise a syringe pump, a peristaltic pump, or a progressive cavity pump.

38. The method of claim 36, wherein each of the first pump and the second pump comprises a progressive cavity pump.

39. The method of claim 36, wherein the mixer comprises a static mixer, a dynamic mixer, or a combination thereof.

40. The method of claim 36, wherein the mixer comprises a static mixer.

* * * * *